(12) United States Patent
Yi et al.

(10) Patent No.: US 11,284,439 B2
(45) Date of Patent: Mar. 22, 2022

(54) METHOD AND APPARATUS FOR SHARING SPECTRUM BETWEEN 3GPP LTE AND NR IN WIRELESS COMMUNICATION SYSTEM

(71) Applicant: LG Electronics Inc., Seoul (KR)

(72) Inventors: Yunjung Yi, Seoul (KR); Seonwook Kim, Seoul (KR); Daesung Hwang, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/475,989

(22) PCT Filed: Jan. 4, 2018

(86) PCT No.: PCT/KR2018/000198
§ 371 (c)(1),
(2) Date: Jul. 3, 2019

(87) PCT Pub. No.: WO2018/128426
PCT Pub. Date: Jul. 12, 2018

(65) Prior Publication Data
US 2019/0357264 A1 Nov. 21, 2019

Related U.S. Application Data

(60) Provisional application No. 62/534,225, filed on Jul. 19, 2017, provisional application No. 62/521,343, (Continued)

(51) Int. Cl.
*H04W 74/08* (2009.01)
*H04L 1/18* (2006.01)
(Continued)

(52) U.S. Cl.
CPC ....... *H04W 74/0833* (2013.01); *H04L 1/1819* (2013.01); *H04L 5/001* (2013.01);
(Continued)

(58) Field of Classification Search
CPC ............. H04W 74/0833; H04W 24/10; H04W 72/0453; H04W 72/046; H04L 1/1819; H04L 5/001; H04L 5/0023
(Continued)

(56) References Cited

U.S. PATENT DOCUMENTS 9,445,373 B2 9/2016 Suzuki et al.
2013/0010964 A1* 1/2013 Fong ..................... H04L 5/0092
380/277
(Continued)

FOREIGN PATENT DOCUMENTS

CN 105191190 12/2015
EP 3101984 12/2016
(Continued)

OTHER PUBLICATIONS

Huawei and HiSilicon, "Considerations of NR UL operation for LTE-NR coexistence, R1-1704199", Apr. 3-7, 2017, 3GPP TSG RAN WG1 Meeting #88bis, p. 1-7 (Year: 2017).*
(Continued)

*Primary Examiner* — Kwang B Yao
*Assistant Examiner* — Xuan Lu
(74) *Attorney, Agent, or Firm* — Fish & Richardson P.C.

(57) ABSTRACT

A method and apparatus for transmitting a physical random access channel (PRACH) in a wireless communication system is provided. A user equipment (UE) receives multiple PRACH configurations which include a first PRACH configuration for new radio access technology (NR) downlink/uplink (DL/UL) carrier in a NR band and a second PRACH configuration for a supplemental UL carrier in a long-term evolution (LTE) band, and transmits at least one of a first PRACH for accessing the NR DL/UL carrier in the NL band by using a first PRACH power based on the first PRACH configuration, or a second PRACH for accessing the supple-
(Continued)

mental UL carrier in the LTE band by using a second PRACH power based on the second PRACH configuration. The first PRACH configuration and the second PRACH configuration include different PRACH power configuration.

17 Claims, 16 Drawing Sheets

Related U.S. Application Data filed on Jun. 16, 2017, provisional application No. 62/520,676, filed on Jun. 16, 2017, provisional application No. 62/519,817, filed on Jun. 14, 2017, provisional application No. 62/492,932, filed on May 1, 2017, provisional application No. 62/491,387, filed on Apr. 28, 2017, provisional application No. 62/442,396, filed on Jan. 4, 2017.

(51) Int. Cl.
| | |
|---|---|
| *H04L 5/00* | (2006.01) |
| *H04W 24/10* | (2009.01) |
| *H04W 72/04* | (2009.01) |
| *H04L 5/14* | (2006.01) |
| *H04L 27/26* | (2006.01) |
| *H04W 52/24* | (2009.01) |
| *H04W 74/00* | (2009.01) |
| *H04W 16/14* | (2009.01) |

(52) U.S. Cl.
CPC ........... *H04L 5/0023* (2013.01); *H04W 24/10* (2013.01); *H04W 72/046* (2013.01); *H04W 72/0453* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2014/0098761 | A1* | 4/2014 | Lee | H04W 72/005 370/329 |
| 2014/0211753 | A1 | 7/2014 | Choi et al. | |
| 2015/0071206 | A1 | 3/2015 | Seo et al. | |
| 2016/0212737 | A1* | 7/2016 | Jang | H04L 5/001 |
| 2017/0013565 | A1* | 1/2017 | Pelletier | H04W 52/365 |
| 2017/0302419 | A1* | 10/2017 | Liu | H04L 5/0082 |
| 2017/0331577 | A1* | 11/2017 | Parkvall | H04L 5/1469 |
| 2018/0124687 | A1* | 5/2018 | Park | H04L 5/1469 |
| 2018/0316481 | A1* | 11/2018 | Montojo | H04W 74/004 |

FOREIGN PATENT DOCUMENTS

| | | |
|---|---|---|
| IN | 20140170914 | 3/2014 |
| JP | 2014518488 | 7/2014 |
| KR | 20150128247 | 11/2015 |

OTHER PUBLICATIONS

Huawei and HiSilicon, "Considerations of NR UL operation, R1-1701668", Feb. 13-17, 2017, 3GPP TSG RAN WG1 Meeting #88, p. 1-5 (Year: 2017).*
NTT DOCOMO, Inc., "Discussion on LTE-NR aggregation," R2-163702, 3GPP TSG-RAN WG2 Meeting #94, Nanjing, China, dated May 13, 2016, 5 pages.
Samsung, "5G Radio Protocol Architecture," R2-162207, 3GPP TSG-RAN WG2 Meeting #93bis, Dubrovnik, Croatia, dated Mar. 31, 2016, 11 pages.
3rd Generation Partnership Project, "Technical Specification Group Radio Access Network", Study on New Radio (NR) Access Technology Physical Layer Aspects, TR 38.802 V1.2.0, Feb. 2017, 82 pages.
EP Supplementary Search Report in European Application No. EP 18736523, dated Nov. 8, 2019, 14 pages.
Huawei, HiSilicon, "Considerations of NR UL operation for LTE-NR coexistence", R1-1704199, 3GPP TSG RAN WG 1 Meeting #88bis, Spokane, USA, Apr. 3-7, 2017, 7 pages.
Huawei, HiSilicon, "Considerations of NR UL operation", R1-1701668, 3GPP TSG RAN WG 1 Meeting #88, Athens, Greece Feb. 13-17, 2017, 5 pages.
European Office Action in European Application No. 18736523.4, dated Jul. 21, 2020, 8 pages.
Huawei, HiSilicon, "Overview of NR UL for LTE-NR coexistence," R1-1709979, 3GPP TGS RAN WG1 NR Ad Hoc Meeting, Qingdao. China, dated Jun. 27-30, 2017, 12 pages.
China Telecom, "Physical layer functionalities to support dual connectivity," R1-140232, 3GPP TSG RAN WG1 Meeting #76, Prague, Czech Republic, dated Feb. 10-14, 2014, 2 pages.
Motorola Mobility, "Discussion on RACH numerology and procedure," R1-1612746, 3GPP TSG RAN WG1 Meeting #87, Reno, Nevada, dated Nov. 14-18, 2016, 3 pages.
3rd Generation Partnership Project; Technical Specification Group Radio Access Network, "Study on New Radio Access Technology; Radio Interface Protocol Aspects (Release 14)," 3GPP TR 38.804, dated Nov. 2016, 30 pages.
Korean Office Action in Korean Appln. No. 10-2019-7022425, dated Oct. 8, 2020, 13 pages (with English translation).
CN Office Action in Chinese Appln. No. 201880007644.X, dated Jun. 22, 2021, 15 pages (with English translation).
Office Action in Chinese Appln. No. 201880007644.X, dated Dec. 9, 2021, 10 pages (with English translation).

* cited by examiner

[Fig. 1]
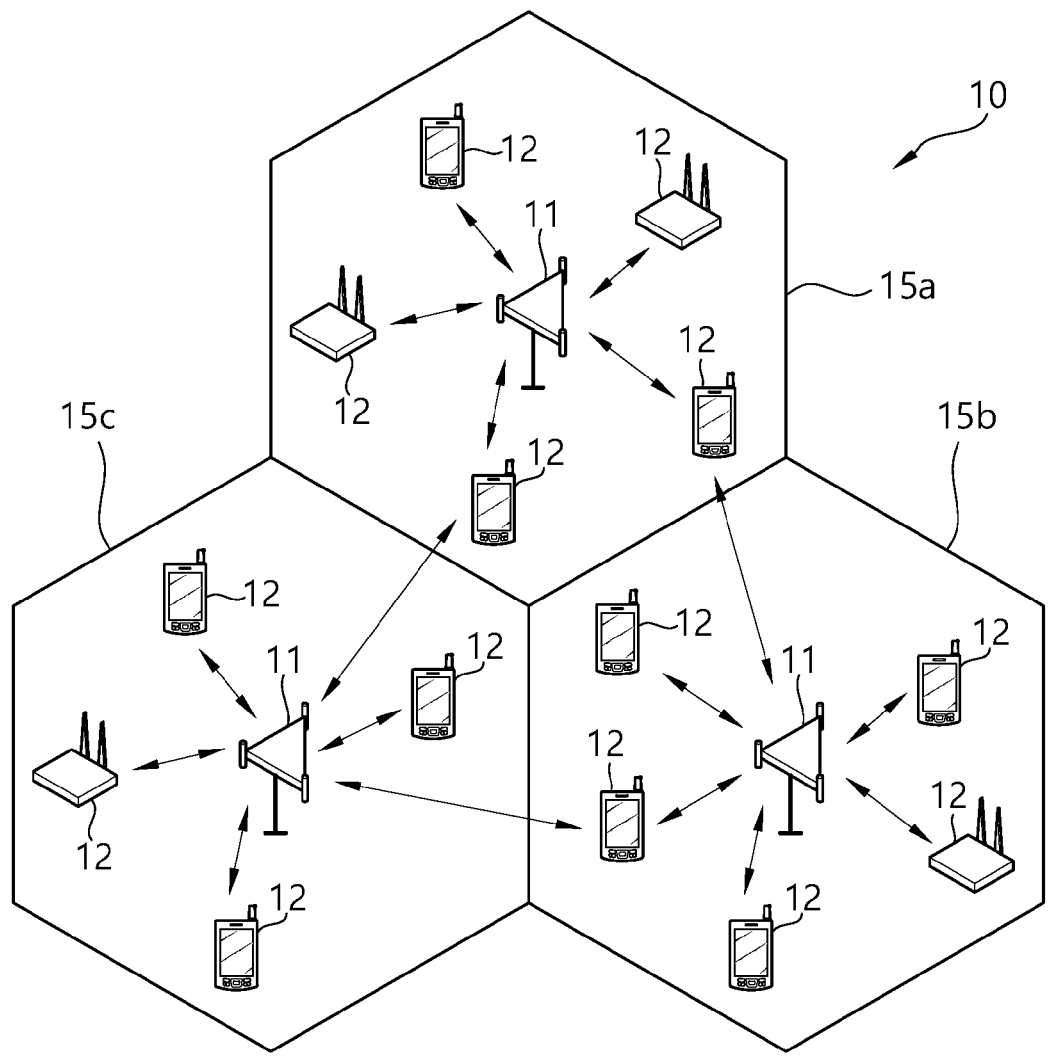
[Fig. 2]
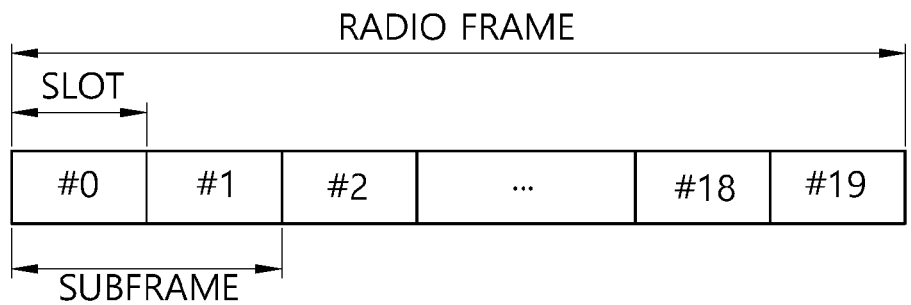

[Fig. 3]
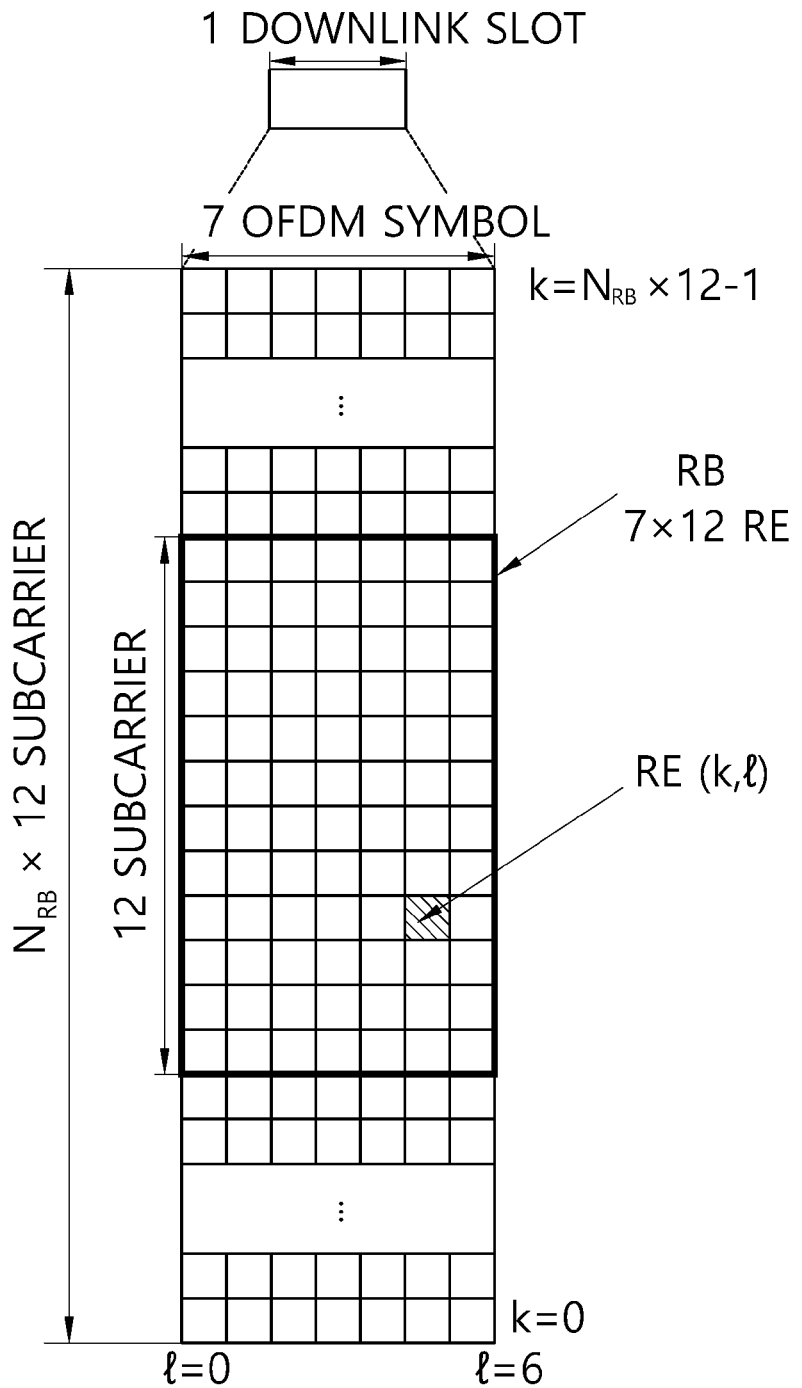

[Fig. 4]
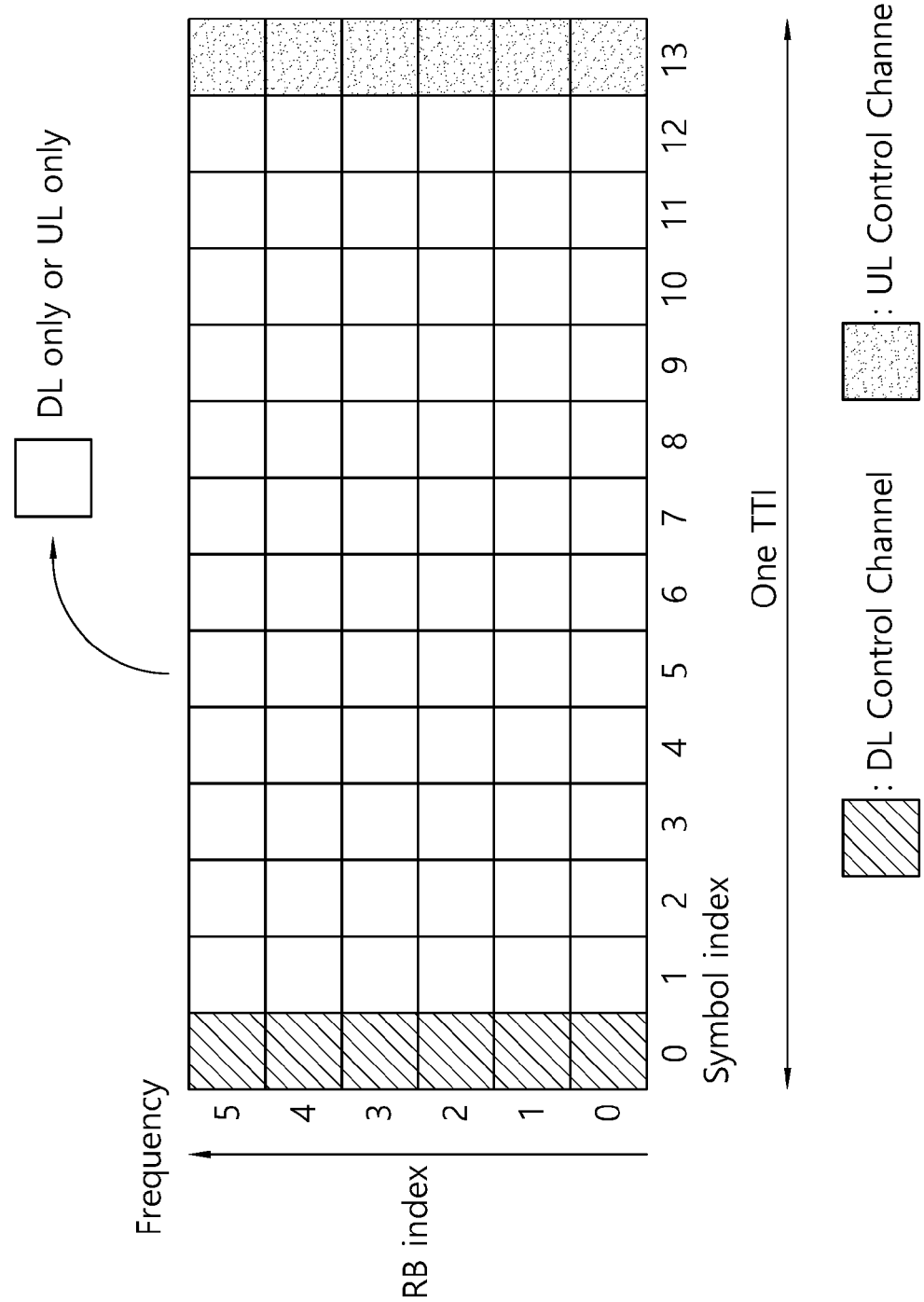

[Fig. 5]
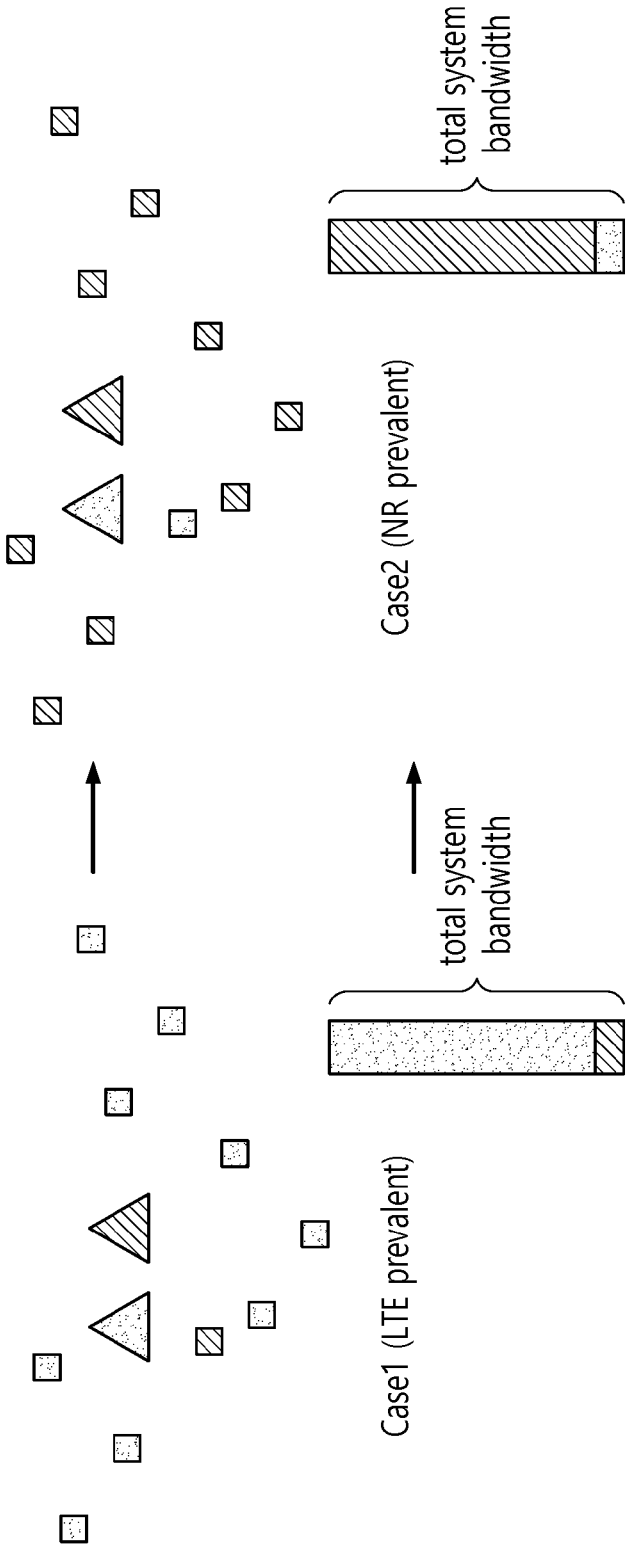

[Fig. 6]
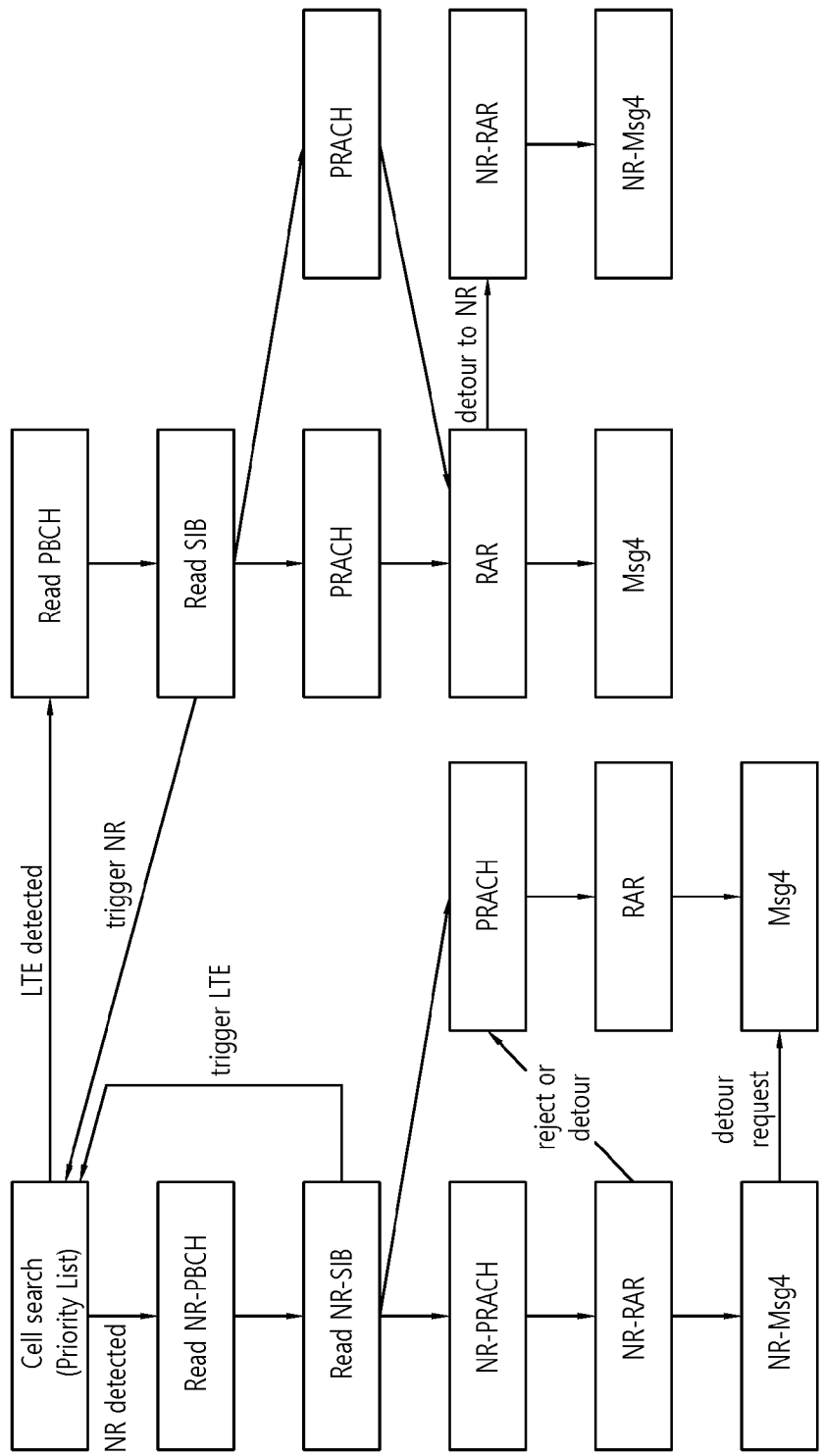

[Fig. 7]
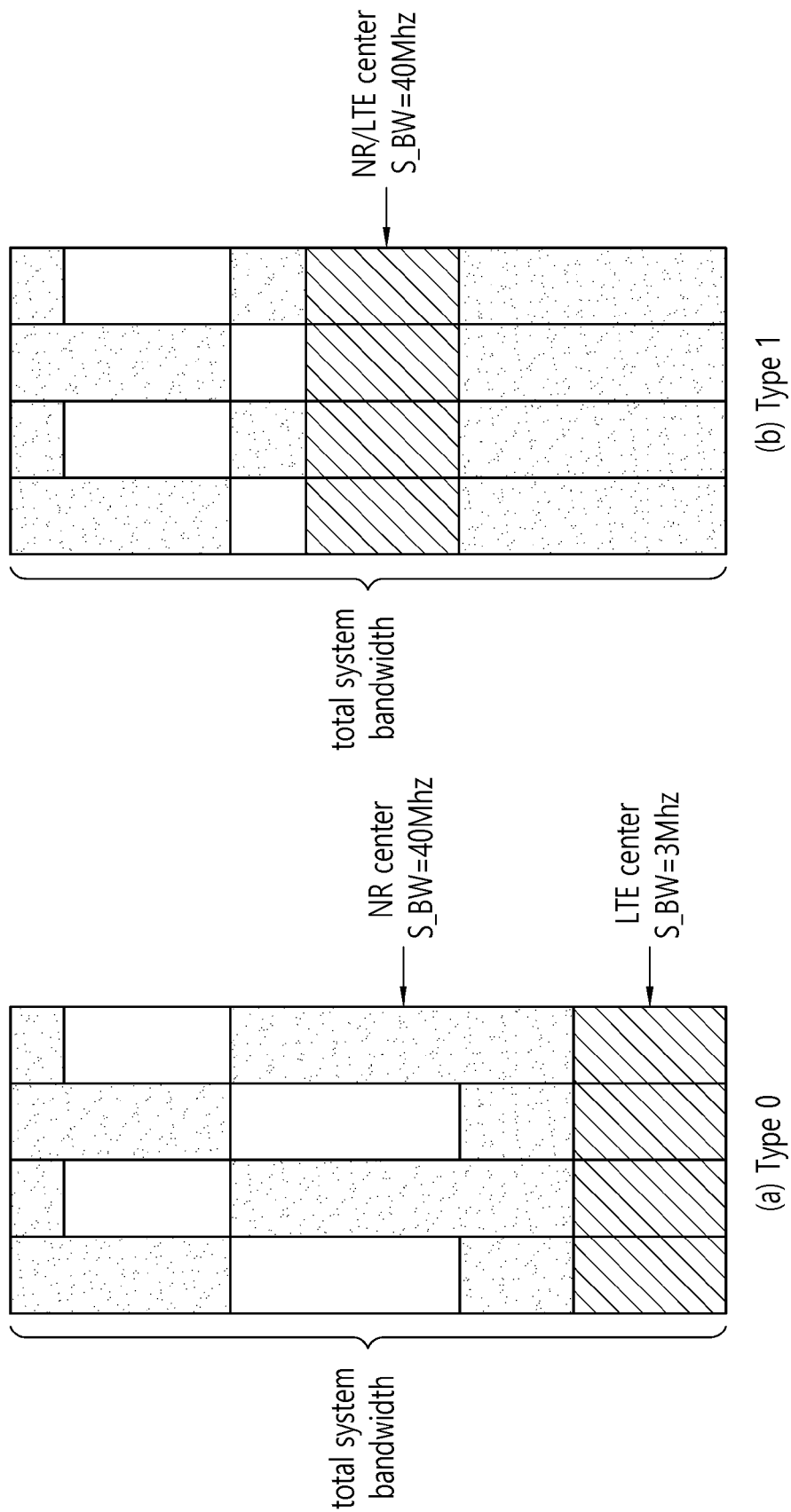

[Fig. 8]
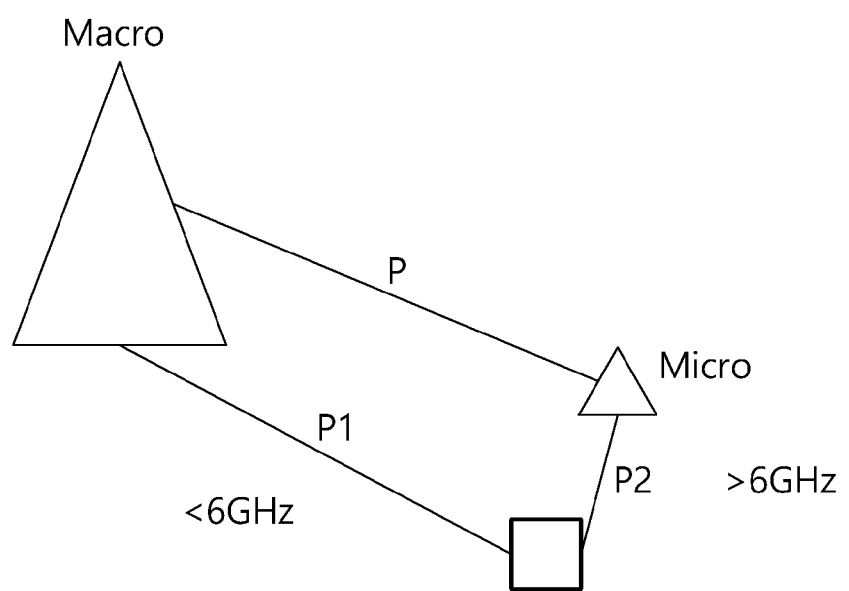

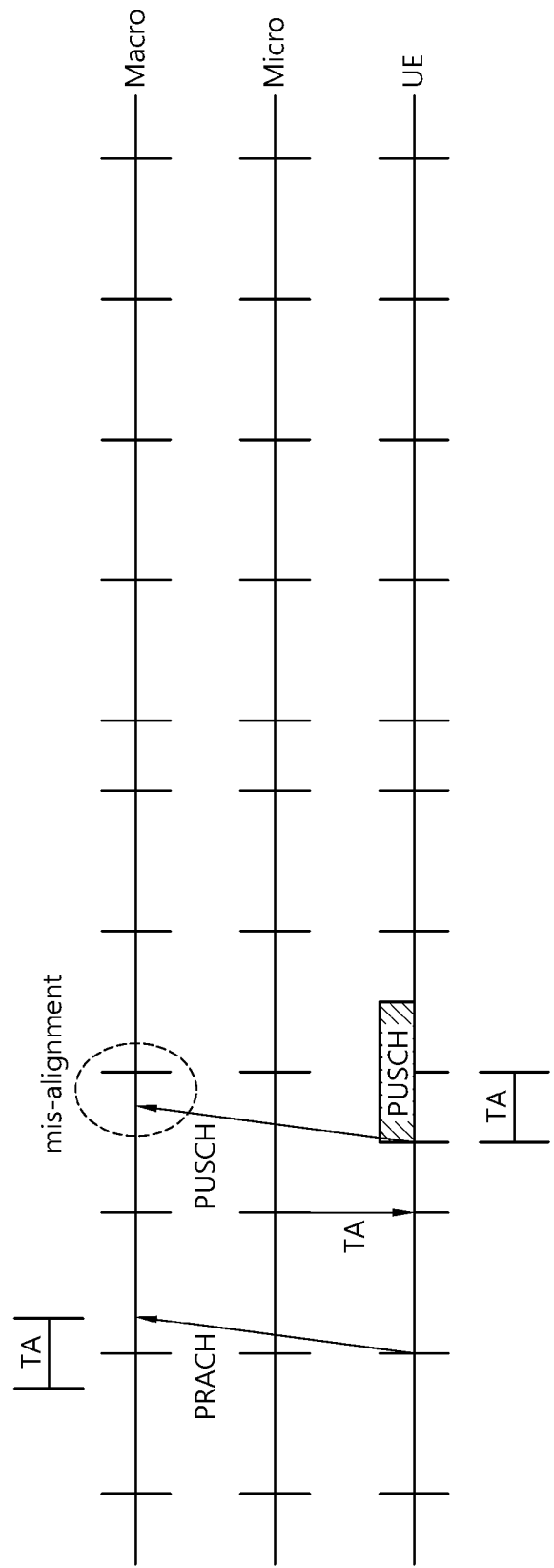
[Fig. 9]

[Fig. 10]
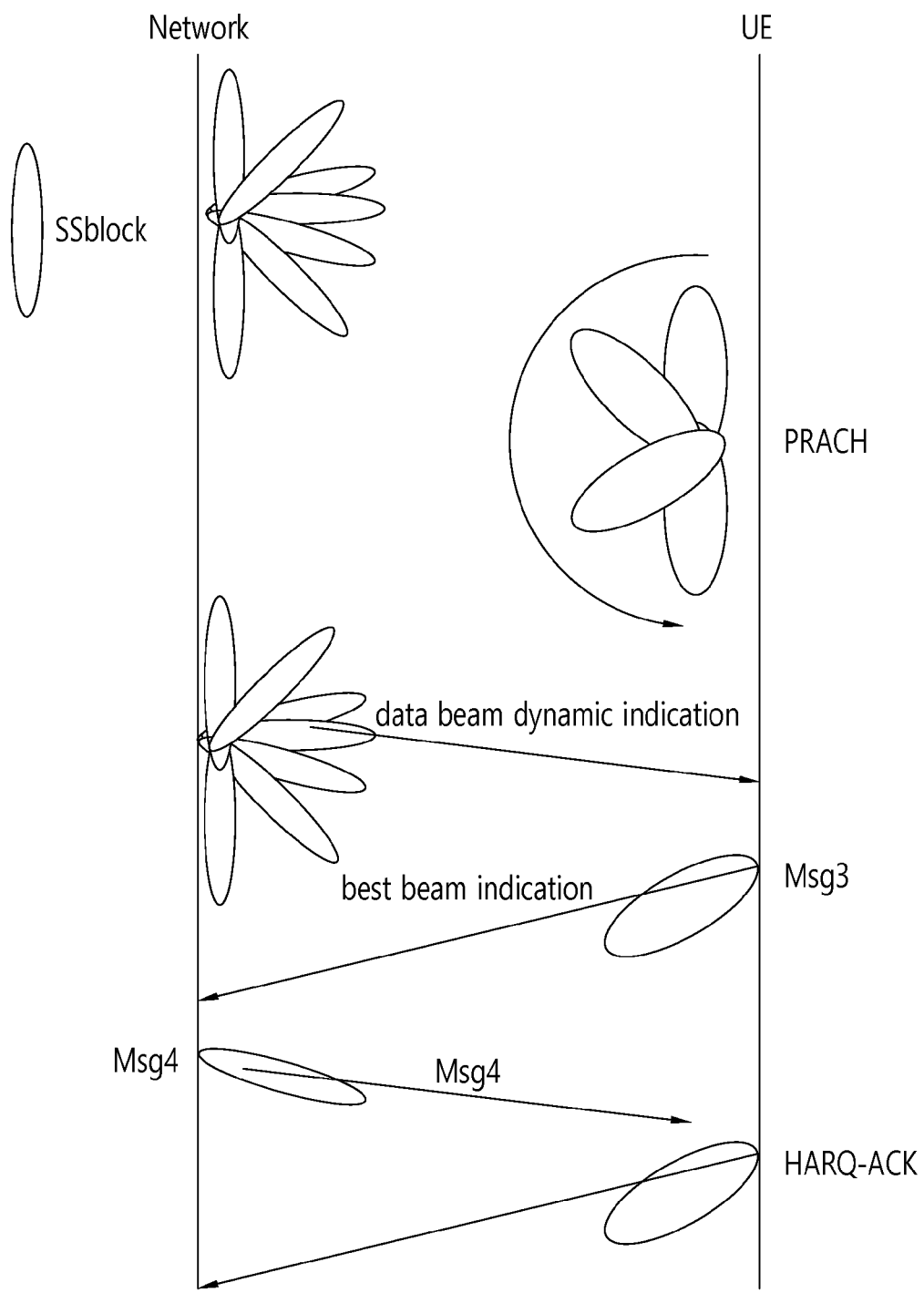

[Fig. 11]
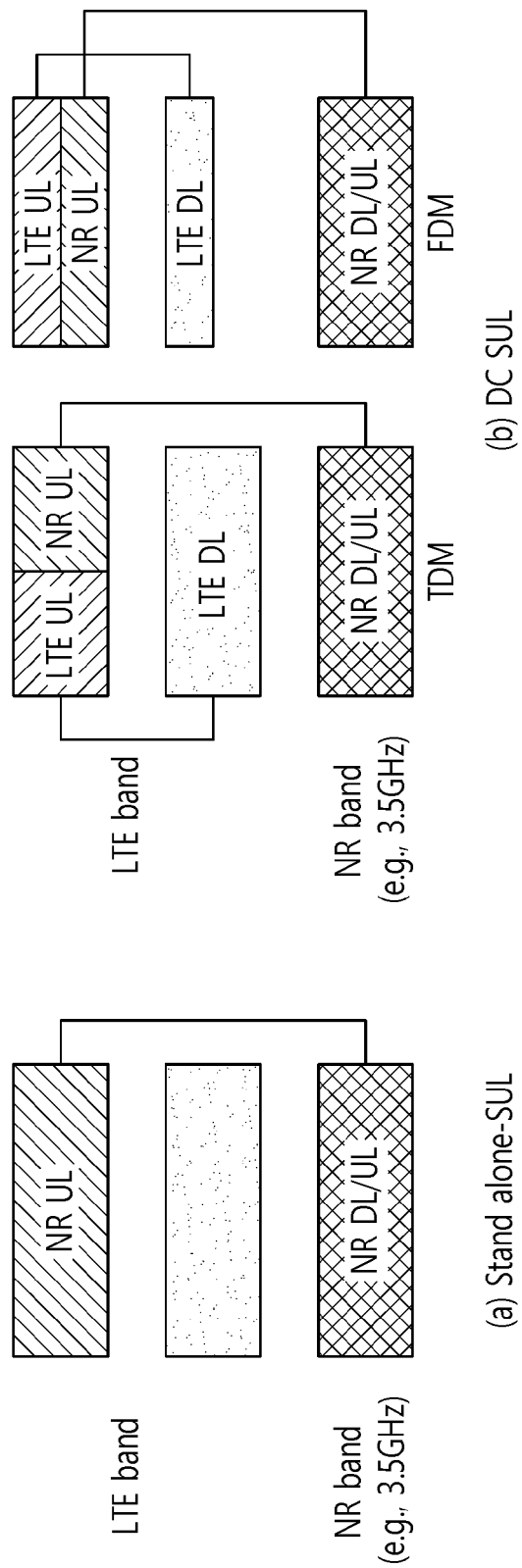

[Fig. 12]
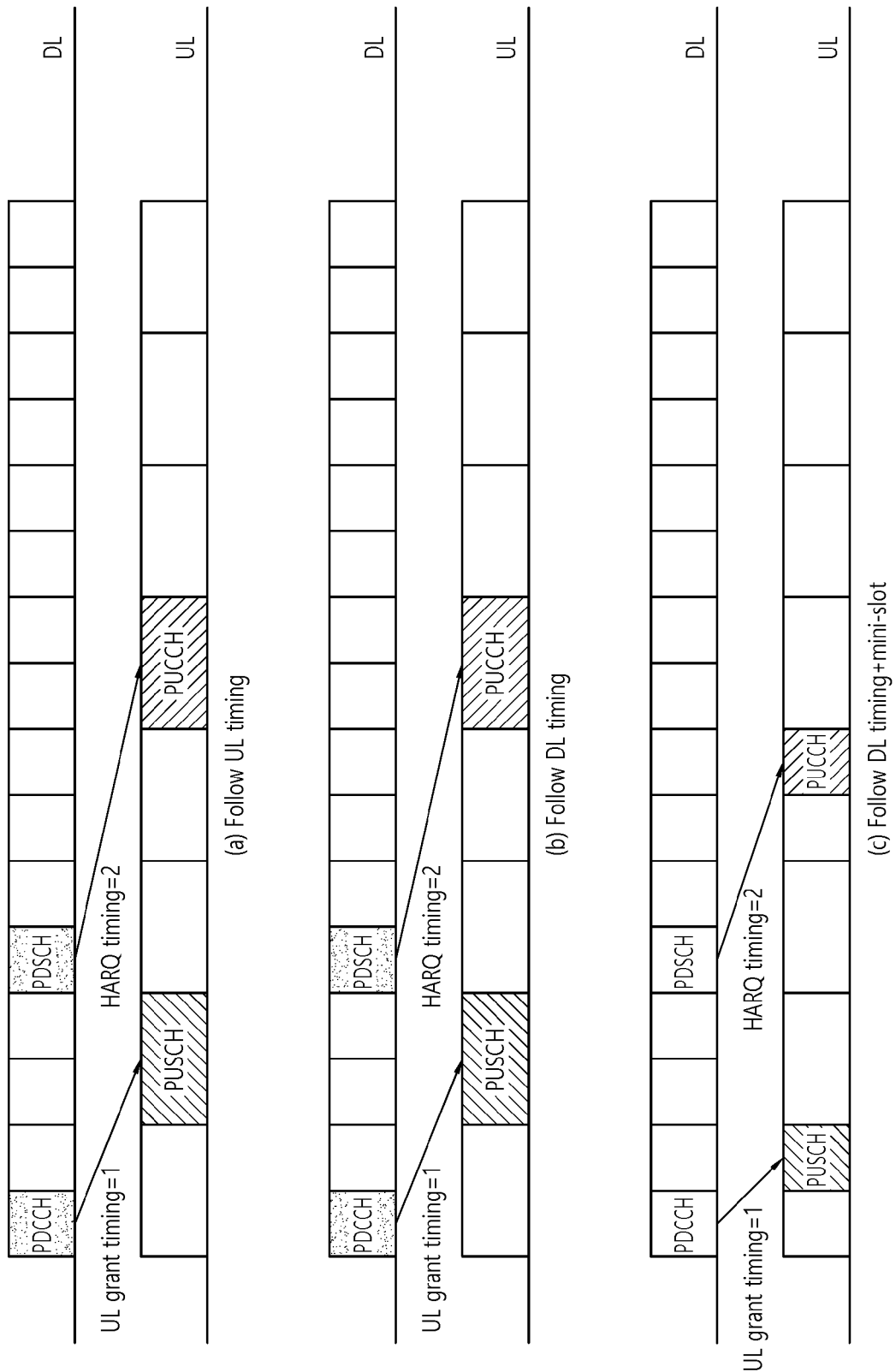

[Fig. 13]
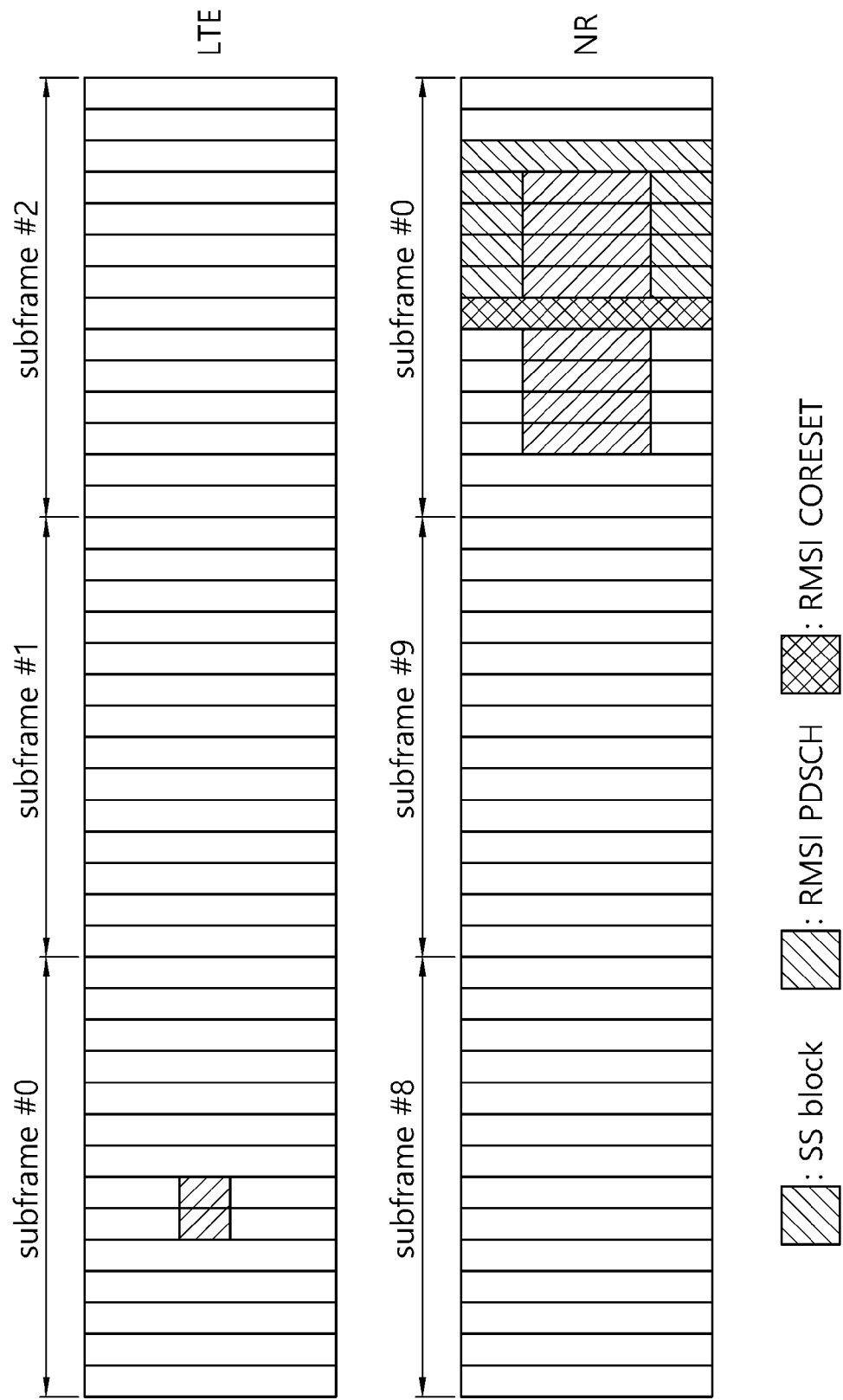

[Fig. 14]
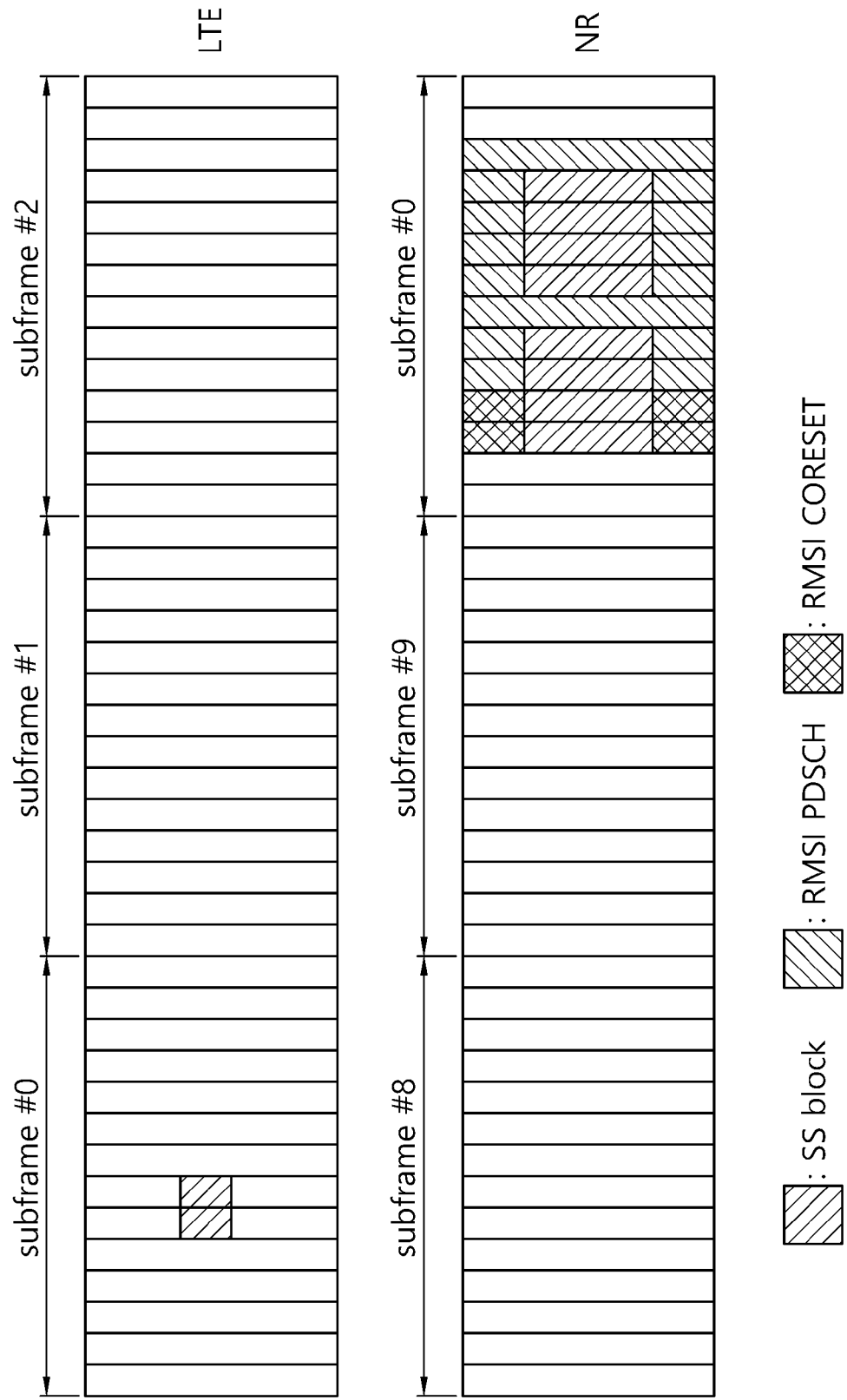

[Fig. 15]
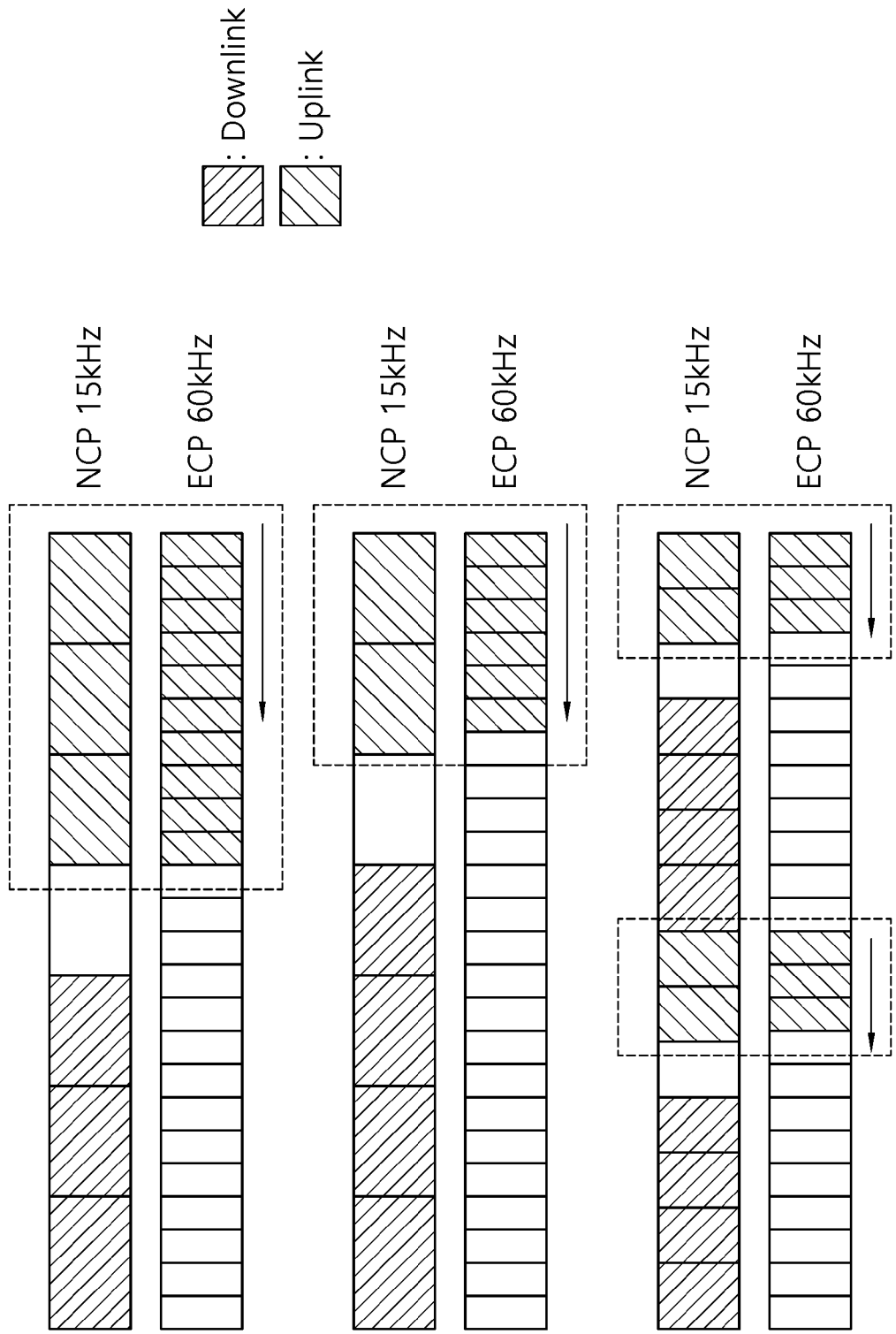

[Fig. 16]
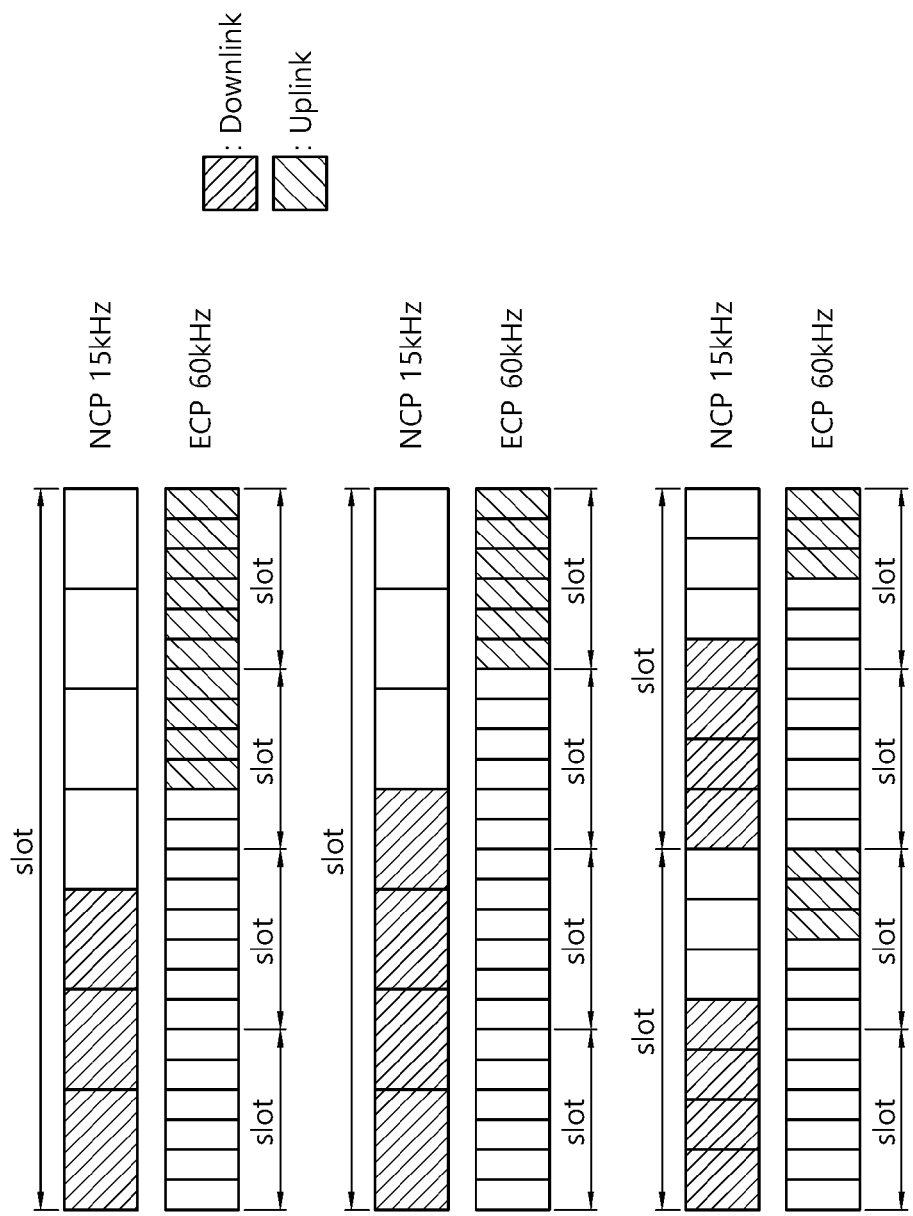

[Fig. 17]
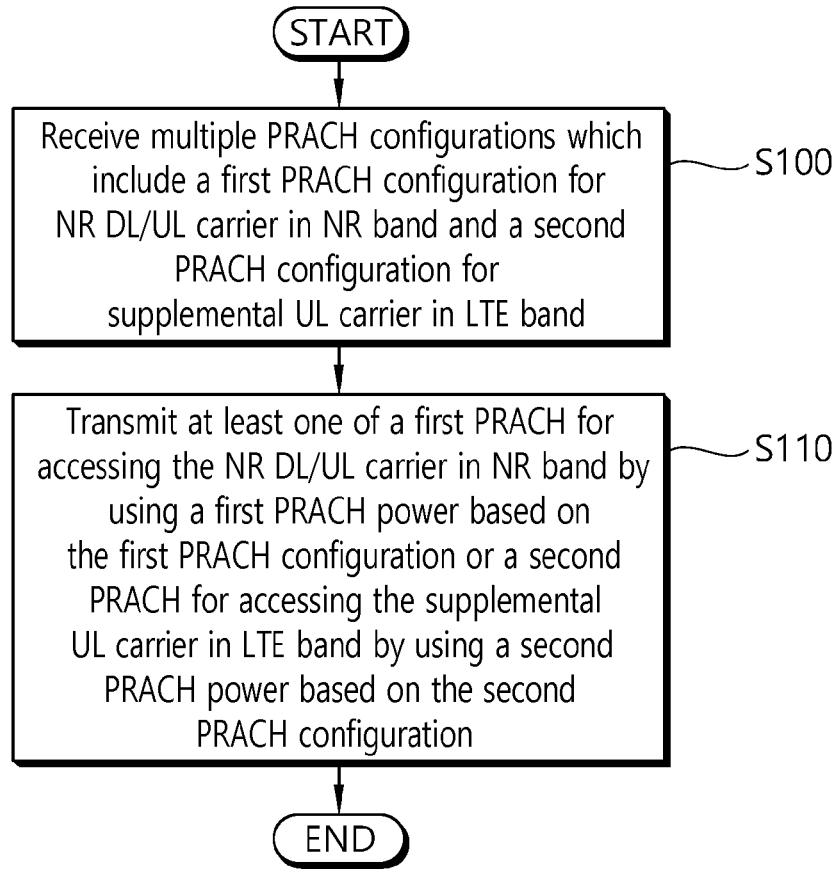
[Fig. 18]
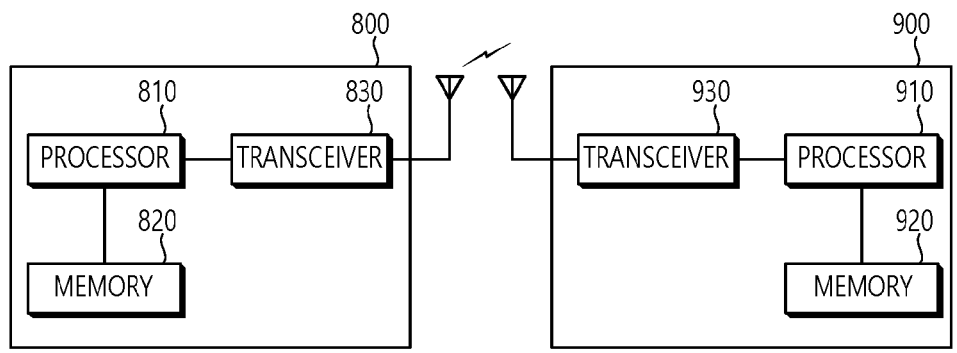

METHOD AND APPARATUS FOR SHARING SPECTRUM BETWEEN 3GPP LTE AND NR IN WIRELESS COMMUNICATION SYSTEM

CROSS-REFERENCE TO RELATED APPLICATIONS

This application is a National Stage application under 35 U.S.C. § 371 of International Application No. PCT/KR2018/000198, filed on Jan. 4, 2018, which claims the benefit of U.S. Provisional Application No. 62/534,225, filed on Jul. 19, 2017, U.S. Provisional Application No. 62/521,343, filed on Jun. 16, 2017, U.S. Provisional Application No. 62/520,676, filed on Jun. 16, 2017, U.S. Provisional Application No. 62/519,817, filed on Jun. 14, 2017, U.S. Provisional Application No. 62/492,932, filed on May 1, 2017, U.S. Provisional Application No. 62/491,387, filed on Apr. 28, 2017, and U.S. Provisional Application No. 62/442,396, filed on Jan. 4, 2017. The disclosures of the prior applications are incorporated by reference in their entirety.

TECHNICAL FIELD

The present invention relates to wireless communications, and more particularly, to a method and apparatus for sharing a spectrum between 3rd generation partnership project (3GPP) long-term evolution (LTE) and a new radio access technology (NR) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

DISCLOSURE OF INVENTION

Technical Problem

The present invention provides a method and apparatus for sharing a spectrum between 3rd generation partnership project (3GPP) long-term evolution (LTE) and a new radio access technology (NR) in a wireless communication system. The present invention discusses spectrum sharing mechanisms between LTE and NR in the same frequency, at least for initial deployment of NR.

Solution to Problem

In an aspect, a method for transmitting a physical random access channel (PRACH) by a user equipment (UE) in a wireless communication system is provided. The method includes receiving multiple PRACH configurations which include a first PRACH configuration for new radio access technology (NR) downlink/uplink (DL/UL) carrier in a NR band and a second PRACH configuration for a supplemental UL carrier in a long-term evolution (LTE) band, and transmitting at least one of a first PRACH for accessing the NR DL/UL carrier in the NL band by using a first PRACH power based on the first PRACH configuration, or a second PRACH for accessing the supplemental UL carrier in the LTE band by using a second PRACH power based on the second PRACH configuration. The first PRACH configuration and the second PRACH configuration include different PRACH power configurations.

In another aspect, a user equipment (UE) in a wireless communication system is provided. The UE includes a memory, a transceiver, and a processor, operably coupled to the memory and the transceiver, that controls the transceiver to receive multiple physical random access channel (PRACH) configurations which include a first PRACH configuration for new radio access technology (NR) downlink/uplink (DL/UL) carrier in a NR band and a second PRACH configuration for a supplemental UL carrier in a long-term evolution (LTE) band, and controls the transceiver to transmit at least one of a first PRACH for accessing the NR DL/UL carrier in the NL band by using a first PRACH power based on the first PRACH configuration, or a second PRACH for accessing the supplemental UL carrier in the LTE band by using a second PRACH power based on the second PRACH configuration. The first PRACH configuration and the second PRACH configuration include different PRACH power configurations.

Advantageous Effects of Invention

3GPP LTE and NR can share a spectrum in the same frequency effectively.

BRIEF DESCRIPTION OF DRAWINGS

FIG. 1 shows a 3GPP LTE system.
FIG. 2 shows structure of a radio frame of 3GPP LTE.
FIG. 3 shows a resource grid for one downlink slot.
FIG. 4 shows an example of subframe type for NR.
FIG. 5 shows an example of changing portions of LTE/NR frequency in a system bandwidth.
FIG. 6 shows an example of initial access procedure according to an embodiment of the present invention.
FIG. 7 shows an example of coexistence of different RATs in a same frequency according to an embodiment of the present invention.
FIG. 8 shows an example of timing advance issue.
FIG. 9 shows an example of timing misalignment between micro and macro.
FIG. 10 shows an example of a case that PRACH does not carry best beam information according to an embodiment of the present invention.
FIG. 11 shows an example of scenarios for SUL according to an embodiment of the present invention.
FIG. 12 shows an example of PDSCH-HARQ-ACK and/or PDCCH-PUSCH timing according to an embodiment of the present invention.
FIG. 13 shows an example of SS block transmission in NR carrier according to an embodiment of the present invention.
FIG. 14 shows another example of SS block transmission in NR carrier according to an embodiment of the present invention.
FIG. 15 shows an example of slot type formation based on DL numerology.
FIG. 16 shows an example of slot type formation based on DL and UL numerology.
FIG. 17 shows a method for transmitting a PRACH by a UE according to an embodiment of the present invention.
FIG. 18 shows a wireless communication system to implement an embodiment of the present invention.

MODE FOR THE INVENTION

FIG. 1 shows a 3GPP LTE system. The 3rd generation partnership project (3GPP) long-term evolution (LTE) system 10 includes at least one eNodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number $N_{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

NR may use the OFDM transmission scheme or a similar transmission scheme. NR may follow the existing LTE/LTE-A numerology, or may follow the different numerology from the existing LTE/LTE-A numerology. NR may have a larger system bandwidth (e.g. 100 MHz). Or, one cell may support multiple numerologies in NR. That is, UEs operating in different numerologies may coexist within one cell in NR.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. A region for DL control channel indicates a transmission area of a physical downlink control channel (PDCCH) for Downlink control information (DCI) transmission, and a region for UL control channel indicates a transmission area of a physical uplink control channel (PUCCH) for uplink control information (UCI) transmission. Here, the control information transmitted by the eNB to the UE through the DCI may include information on the cell configuration that the UE should know, DL specific information such as DL scheduling, and UL specific information such as UL grant. Also, the control information transmitted by the UE to the eNB through the UCI may include a hybrid automatic repeat request (HARD) acknowledgement/non-acknowledgement (ACK/NACK) report for the DL data, a channel state information (CSI) report on the DL channel status, and a scheduling request (SR). The remaining symbols may be used for DL data transmission (e.g. physical downlink shared channel (PDCCH)) or for UL data transmission (e.g. physical uplink shared channel (PUCCH)).

According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Hereinafter, various aspects of sharing a spectrum between 3GPP LTE and NR are described according to embodiments of the present invention. While changing from 4G to 5G (or 3GPP LTE from NR), UEs supporting only LTE and UEs supporting both RATs may coexist. In such cases, depending on advanced UE percentage, it may be beneficial to dynamically change the portion of NR frequency/time usage or LTE frequency/time usage in the same frequency band. A network may perform secondary cell (SCell)-off in LTE if the network wants to reduce the LTE frequency usage portion. LTE eNB and NR gNB may collocate or non-collocate. The present invention may be applied to different deployment scenarios including non-ideal backhaul conditions between LTE and NR cells.

FIG. 5 shows an example of changing portions of LTE/NR frequency in a system bandwidth. In case 1, there are UEs supporting only LTE more than UEs supporting both RATs. Accordingly, LTE frequency usage portion may increase in a total system bandwidth. In case 2, there are many UEs supporting both RATs than UEs supporting only LTE. Accordingly, NR frequency usage portion may increase in a total system bandwidth.

In order to support this operation, the following approaches may be considered from LTE perspective.

A LTE UE may not support flexible bandwidth. Thus, it is necessary to de-attach all UEs from LTE carrier and change the system bandwidth by updating master information block (MIB)/system information blocks (SIBs). However, this may lead some latency of reconfiguration via MIB/SIB information changes, and thus, may not provide dynamic reconfiguration or flexible spectrum sharing between two RATs.

Alternatively, instead of relying on system information update on system bandwidth, intra-frequency carrier aggregation (CA) of LTE spectrum may be used. For example, if total system bandwidth is M MHz, it may be divided to K*M/K MHz frequency chunks, and UEs may be associated with M MHz via intra-CA capability. In this case, to disable one or a few frequency chunks, the network may simply deactivate SCell and perform SCell-off. To transmit discovery signals, NR may not use some resources used by discovery signals to minimize the interference. In terms of reserving some resources for discovery signal transmission, discovery signals may puncture transmitted NR signals. For example, signals based on 15 kHz subcarrier spacing may be used in NR, and resources used for legacy discovery signals may puncture transmitted NR signals. Due to discovery signal, the performance of NR signals may be degraded. For example, control signals and data signals may rather be deteriorated. The handling of this may be done by proper code rate adaption and resource allocation by scheduling.

A LTE UE may support flexible bandwidth. In this case, LTE cell may configure minimum bandwidth as small as possible, and allow flexible bandwidth operation to LTE UEs. LTE UEs may adapt the size of bandwidth dynamically. NR cell may also adapt the size of bandwidth dynamically depending on LTE/NR UE populations.

A LTE UE may also support NR, and LTE and NR may be flexibly interchanged from LTE UE perspective. Assuming NR efficiency is generally better than LTE efficiency, if UEs support both LTE and NR, it is better to operate with NR unless there is coverage difference. In this sense, if all UEs support NR, the problem of sharing may not be significant where LTE portion/SCell can be deactivated, and NR may adapt its system bandwidth flexibly to cover the entire system bandwidth.

From NR supporting UE (hereinafter, NR UE) perspective, the following two possibilities may be considered.

NR UEs may also support LTE in the same frequency or frequency band where the UE is mainly associated with NR. This may also include a case that a UE can support NR and LTE simultaneously (e.g. intra-band CA or dual connectivity (DC)) in one frequency band.

NR UEs may not support LTE. This implies that NR UEs may support LTE in different frequency band, but do not support LTE in the same frequency where NR can be operated. Or, NR UEs may not support LTE. Or, NR UEs may be able to support either NR or LTE at one frequency band.

Based on the approaches described above, the followings may be considered.

(1) NR UE system bandwidth signaling

The system bandwidth of NR may change depending on the usage of LTE spectrum or other usage (for example, acquiring or utilizing more spectrum in case of licensed shared access or utilizing unlicensed spectrum-dynamic allocation of unlicensed spectrum). Accordingly, it may be necessary to signal minimum and maximum system bandwidth that the cell intends to support. Also, the center frequency of synchronization signal or predetermined signal which is generally used for center frequency may not be in the center of maximum system bandwidth. In that sense, it may also be desirable to indicate center frequency of minimum system bandwidth and maximum system bandwidth. Or, offset between center frequency of minimum system bandwidth and center frequency of the reference signal such as primary synchronization signal (PSS) or offset between reference signal and center frequency of maximum system bandwidth may be indicated. These information may be forwarded by synchronization signals and/or MIB and/or SIB. By knowing the range, UE may be able to adjust its receiving bandwidth (both radio frequency (RF) and baseband) potentially to reduce power consumption or for other purposes. However, it may be desirable that start and end of the maximum system bandwidth would not exceed RF bandwidth of a UE assuming center frequency of the reference signal or assuming that UE may retune to center frequency of maximum system bandwidth. Furthermore, it may be desirable that direct current (DC) subcarrier would not be changed. Thus, DC subcarrier may be placed in the center of reference signals or minimum system bandwidth.

Between minimum system bandwidth (min_SBW) and minimum system bandwidth (max_SBW), any cell-common signals, such as synchronization signals, physical broadcast channel (PBCH), and potentially SIB, may be transmitted within min_SBW. For multi-cell operation, such as coordinated multi-point (CoMP) transmission, multimedia broadcast multicast services (MBMS), may be performed on min_SBW. Or, system bandwidth applied for each operation may be separately configured depending on the deployment scenarios of neighbor cells. If it is supported beyond min_SBW, dynamic signaling may be necessary to change the bandwidth. If semi-statically min_SBW is changed, it is also possible that min_SBW is equal to max_SBW.

The signaling of max_SBW may be UE-specific or group-specific. For example, certain frequency may be available only to a group of UEs depending on the locations and/or channel conditions and/or UE capabilities. Furthermore, the bandwidth may also be differently configured per different radio resource control (RRC) connection or a connection which may be differentiated from the physical layer depending on e.g. application or use cases. For example, for ultra-reliable and low latency communication (URLLC) or enhanced vehicle-to-everything (eV2X) use cases, the bandwidth may be smaller or larger than enhanced mobile broadband (eMBB) use case. Depending on different connection, as UE baseband may be different per use case or per connection, bandwidth may be differently configured. There may be multiple connections which may have the following characteristics.

Regardless of multiple connections, synchronization may be performed once. If additional synchronization is necessary for different connection, it may be required to be performed again.

Different RRC parameters/U-Plane bearer, etc., may be configured per each connection.

Each connection may have different blank resources and/or different system bandwidth and/or different numerology and/or different TTI length. This may also be applied to other cases.

(2) One UE supporting both LTE and NR (i.e. FDM or TDM)

If NR UEs support rate matching around cell-specific signals of LTE, spectrum allocated to LTE may be dynamically used for NR UEs if numerologies are compatible. For example, NR UEs may be signaled with frequency range where LTE cell may transmit legacy LTE PDCCH and/or LTE cell-specific reference signal (CRS), then NR UEs may perform rate matching if data and/or control is scheduled on the overlapped portion with LTE. Necessary information such as the length of PDCCH, CRS antenna port number, cell identifier (ID) and/or vshift value may also be signaled. If NR RS and LTE RS collide with each other in the same RE location, a UE may assume that LTE RS may not be transmitted in the resources signaled for NR. Even though a UE supports both RATs, the approaches mentioned above in (1) may be still applied. Major difference between (1) and (2) is to utilize the known information of legacy signals for rate matching or data reception.

As a UE may have different capabilities in terms of understanding LTE signals, different rate matching patterns or behaviors may be assigned to different UEs in terms of dynamic resource sharing between NR and LTE. For example, if the UE supports LTE signal interpretation, the network may configure rate matching around CRS at RE level, whereas if the UE does not support LTE, the network may configure rate matching around CRS symbols.

Initial cell search according to an embodiment of the present invention is described.

In the frequency spectrum where NR and LTE may coexist, a UE may perform both LTE and NR cell search algorithms. As there may be LTE and NR synchronization signals in the same frequency, the UE may attempt to start initial access towards either LTE or NR. When a UE is associated with either LTE or NR, after capability signaled, it may be reconfigured or handed over to the NR or LTE (i.e. different RAT). For this, the physical random access channel (PRACH) resource configuration may also signal PRACH resources which may also be used for NR UEs. In other words, one or more PRACH resources may be signaled which may be used for UEs supporting both NR and LTE. When those resources are used, the network may perform NR operation on UEs supporting both NR and LTE as follows.

(1) When the network transmits random access response (RAR), the network may signal the frequency of NR to hand over the UE to NR. The network may also signal the frequency of LTE. Or, it may be configured by RRC signals in Msg4. The information may include frequency, bandwidth, and/or the RAT type.

(2) From the transmission of RAR, the network may signal or transmit all RS/data based on NR format. From a UE perspective, all the LTE cell-common (or backward compatible) signals may be rate matched or punctured. The cell-common signals may be informed via UE-specific signals or cell-specific signals or group-specific signals. In this sense, the network may form LTE and NR in the same spectrum, and LTE UE and NR UE may be multiplexed in different manners such as FDM/TDM/code division multiplexing (CDM)/spatial multiplexing, etc.

FIG. 6 shows an example of initial access procedure according to an embodiment of the present invention. Overall, the procedure of cell association may be as follows.

(1) Cell search: The following two cases may be considered.

Cell search signals such as PSS/SSS may be common in LTE and NR. When a cell supports both RATs, a common cell search signals may be transmitted. In this case, the cell may also transmit legacy PBCH and/or legacy SIB so that legacy LTE UEs can access LTE cells. The legacy PBCH and/or legacy SIBs may be optionally not transmitted by the network if it is expected that there are no legacy UEs in the network. Furthermore, if LTE cell is used only for SCell from LTE legacy UEs perspective, legacy PBCH and/or legacy SIBs may or may not be present. Even though the same logic is used, to differentiate between NR and LTE, different root indices may be used. In NR, no DC tone may be used for at least data transmission. To enable the same logics between NR and LTE, at least for initial signal detection (e.g. PSS), DC tone (NULL tone) may be assumed at the center of UE receiver.

Cell search signals may be independent and may be different in LTE and NR. A UE may have different receiver algorithms or assumptions (e.g. different root indices between NR and LTE) to detect each RAT's synchronization signals. In this case, a UE may be configured with a priority list where in each frequency either LTE or NR is first searched. The priority RAT may be configured per frequency or band or per frequency region.

(2) PBCH reading: When the same cell search signals are used, the same PBCH transmission may also be used. In this case, legacy PBCH may include RAT type by utilizing reserved bits or reshuffling the PBCH entries. Alternatively, even with the same cell search signals, different PBCH may be transmitted which utilizes different resources. One additional synchronization signal may be present for NR and a UE may attempt to read NR related PBCH and the associated SI transmissions. The example of additional signal may be beam indicator or extended synchronization signals which may be used for location of synchronization signals and/or beam direction. If different cell search signals are used, different PBCH may be assumed, and following the cell search signals, the UE may read the corresponding PBCH (NR-PBCH and PBCH respectively for NR and LTE).

(3) SIB reading: Based on PBCH, either NR-SIB or SIB may be read. In NR-SIB, if the network wants to detour UEs to LTE carrier, the network may signal LTE center frequency. Then, the UE may switch to the LTE center frequency and starts LTE cell association. If the UE does not support LTE, the UE may ignore the field and proceed with NR cell association.

In SIB, different PRACH configurations may be given. In NR, PRACH resources for LTE may be configured. If the UE selects LTE PRACH resources, the corresponding cell association may be done based on LTE procedure. In this case, PBCH/SIB for LTE may be UE-specifically signaled, instead that a UE needs to read broadcasted PBCH/SIB transmissions. In other words, though the cell supports both RATs, the cell may broadcast either LTE or NR related common signals for PBCH/SIB. In terms of switching UEs from different RATs, those information may be given via UE-specific signaling.

In terms of RACH procedure, offloading via RACH procedure may be considered. When the network receives NR-PRACH and there are many NR UEs, the network may transmit reject signals so that LTE-supporting UEs can be detoured to LTE. The reject signals may carry an overloading indication in each PRACH resource so that UEs supporting both RATs can select one PRACH resource based on loading conditions of each RAT. In other words, each PRACH resource may include optional field of RAT indication and overloading indication so that UEs supporting both RATs may utilize those information for better selection of RAT and PRACH resource. Though the network may be able to dynamically change the frequency portion of each RAT, dynamic loading may also be used to balance between different RATs. This information may also be indicated in PDCCH order or PRACH trigger which can be used for handover operation or change the RAT behavior of a UE. Once a UE is configured with PRACH trigger with different RAT type from the operating RAT type, the UE may perform necessary handover procedure. Furthermore, if a UE is configured with multiple connections, PRACH trigger may be applied to all connections or partially to subset of connections. This implies that all or partial subset of connections may be switched to different RAT type or cell. Furthermore, a UE may select different RAT based on its application characteristics or requirements.

(4) RACH procedure: Based on PRACH resource selection, different RAR and RACH procedure may be expected. In NR, additional PRACH resource for LTE may be configured which are then responded with either NR-Msg3 or legacy Msg3. When the UE starts from legacy signals, the UE may initiate with legacy RACH procedure, which may be detoured when Msg 4 is received or via RAR.

(5) RRC configuration: Based on each RAT type, appropriate resource configuration may be given.

Another approach is that a UE may be associated with the cell either via NR or LTE procedure depending on the searched synchronization signals and/or PBCH signals. Once the UE is connected with either RAT type, the cell may indicate additional resources of different RAT. From a UE perspective, it is single carrier and different RAT coexists in the same carrier.

FIG. 7 shows an example of coexistence of different RATs in a same frequency according to an embodiment of the present invention. FIG. 7-(a) shows Type 0 case, and FIG. 7-(b) shows Type 1 case.

(1) Type 0: When LTE center is not aligned with NR center, and if NR uses center frequency DC, it may be able to be used for LTE. However, it is expected that NR may not utilize DC to avoid alignment between center and synchronization signals. In this case, as LTE needs to use center frequency DC, the DC should be accounted properly. One approach is to absorb the DC in the adjacent PRB of NR, and accordingly, the adjacent PRB consists of N−1 subcarriers instead of N carriers. Once a UE is associated with LTE carrier, additional NR PRBs may be configured with center frequency, system bandwidth, blank resources, etc. For UEs supporting NR only, to align PRBs between NR and LTE, it may be configured to have a DC in NR carrier as well, and it may be indicated to the UEs on the location of DC tone which is not accounted for RB construction. In this case, it may become challenging to support different numerologies, and thus, only 15 kHz subcarrier spacing may be used in this case.

(2) Type 1: When both RATs are aligned, NR may reserve DC tone unused as well. In this case, the PRB formation of NR may not be affected. If NR does not reserve DC tone, the similar issue or handling to Type 0 may be necessary.

The frequency offset between NR and LTE center frequency, NR system bandwidth, necessary information may be configured. For UEs not supporting LTE, LTE bandwidth may be treated as blank resources. In terms of blank resources, two types of blank resources configuration may be considered as follows.

(1) Entire blank resource: A UE may assume that any RS/data/control will not be mapped to the configured resource. One example is to configure one slot or subframe as blank resource.

(2) Partial blank resource: A UE may assume that some RS/data/control may be mapped to the resource where at least partial resources may not be used. In terms of partial resources not usable, some signaling may be considered. For example, the bitmap of 144 (one RB mapping) may be used, and each bit may be mapped to one RE in the PRB, which then will be assumed to be constant across the configured PRBs. Alternative signal reductions may also be considered, e.g. legacy control region symbol length, CRS ports, cell ID, CSI-RS, positional reference signal (PRS), etc., which may cover legacy LTE cell-common signals. Alternatively, blank resource may be configured in subcarrier level instead of PRB level, to allow finer configurability. Alternatively, the blank resource may be configured in RE level in frequency domain and OFDM symbol level in time domain, and RE level may be applied to the entire system bandwidth or UE bandwidth.

To allow blank subframe configuration dynamically, semi-statically configured blank subframe set(s) may be dynamically enabled or disabled. For example, semi-static set(s) of blank resources may be configured, which may be dynamically enabled or disabled via the one of the following approaches.

(1) Explicit enabling/disabling dynamic signaling: L1 or media access control (MAC) control element (CE) may be used to dynamically enable/disable. The signaling may be UE-specific or cell-common or group-specific.

(2) UE blind detection (BD): Via the scheduling, and/or detecting the associated NR signals in the blank resources, the UE may detect whether the resource is used for NR or not. Or, depending on UE BD on some other signals which may be present in the blank resource (e.g. LTE CRS), the UE may determine whether the resource is used for other RAT or other purpose.

When the UE is configured with LTE and NR, depending on the anchor RAT (based on initial cell association procedure), the following approaches may be considered.

(1) Anchor RAT is LTE: In this case, additional NR resources may be considered as segments which may be used for control and/or data transmission in which CRS may not be transmitted. RS for control/data demodulation may be separately signaled.

(2) Anchor RAT is NR: In this case, additional LTE resources may be considered as partial blank resources which then may be used with proper rate matching on legacy LTE signals.

Depending on the bandwidth of each RAT, either (1) or (2) may be selected and used.

Another approach is to assume CA or dual connectivity between two RATs to allow separate MAC entity in different MAC. For example, in Type 0, intra-contiguous CA may be assumed for NR and LTE. In Type 1, intra CA may be assumed, and handling of segmented NR carrier may be different per UE implementation. One example is to configure three intra-contiguous CA carriers in Type 1.

If CA approach is used between NR and LTE, the following procedures may be clarified.

(1) Primary cell (PCell) determination: Between NR and LTE, PCell may be clarified. It may follow initial synchronization signal detection, and may be changed via RRC signaling once cell association procedure is completed. In other words, the similar cell association procedure mentioned above may be used for CA case as well which may be reconfigured once cell association is completed.

(2) Cross-carrier scheduling: By allowing tight interaction between NR-MAC and LTE-MAC, real-time processing, cross-carrier scheduling may be used. When cross-carrier scheduling is used, the control format may follow a carrier scheduling another carrier. DCI content may follow scheduled carrier format. In other words, actual control channel format may follow scheduling carrier's RAT and contents may be based on scheduled carrier's RAT. One consideration is to allow dynamic bandwidth change between LTE and NR, which may be indicated in scheduling, the bandwidth of LTE dynamically.

(3) Scheduling request (SR): SR may be transmitted in either RAT, which may have different format. A single timer may be shared between different RATs as long as timer values are consistent. Or, independent SR may be configured per each RAT. When the same timer is used between two RATs, once timer expires in one RAT, it may also trigger timer to expire in the other RAT and the necessary procedures may be performed.

(4) Power headroom reporting (PHR): PHR may also be reported in a shared format between two RATs. However, it may be desirable to report different contents per each RAT which are shared by two RATs. For example, when a UE is capable of only one UL carrier, the PHR value may be different depending on RAT type, and thus, two different PHRs may be reported even though the UE supports only one UL carrier. Each of UL carriers may be associated with different RAT or may be shared between two RATs. Depending on its configuration, PHR reporting may be different. As long as one UL carrier may be associated with two different RATs, different PHRs may be reported.

Regardless which approach is used to support LTE and NR, synchronization assumptions should be clarified between LTE synchronization signals/RS and NR synchronization signal/RS. To allow the above listed approaches, it may be necessary to satisfy at least CA synchronization requirements (tight synchronizations). Simple assumption may be to assume quasi-collocation (QCL) between LTE and NR synchronization signals/RS transmissions. In other words, based on LTE synchronization signals and/or RS, NR RS may be fine-tuned (and vice versa).

Another approach is to support LTE and NR together via dual connectivity like framework and separate MAC and handling may be used. In this case, any relationship between two RAT's synchronization signals/RS may not be necessary. Similar to dual connectivity, the synchronization assumptions may be indicated by higher layer signaling.

Different interworking mechanisms according to an embodiment of the present invention is described.

(1) RAT type configuration per RRC or user-plane (UP) connection

RAT configuration may be configured similar to transmission mode. In other words, per UP bearer or RRC connection, different RAT type may be configured. Different RAT type may indicate or define the UE behavior of at least one of the followings.

Control channel design whether to follow NR control channel configuration/design or LTE control channel configuration/design DCI content PDSCH coding mechanism, transport block size (TBS) table, modulation and coding scheme (MCS) table, etc.

Channel quality indicator (CQI) mechanism (2) Synchronization reference of LTE cell for NR cells For efficient UE behavior, cell common transmission may be performed using one RAT. Furthermore, this may also be indicated with SCell addition and different RAT may be used per different carrier. Also, if NR and LTE cell performs CoMP operation, in terms of data rate matching, RAT type may be also indicated dynamically or rate matching factor may be dynamically indicated. Though QCL relationship between RS types transmitted in NR may not be present, QCL relationship between LTE-CRS and NR-RS (e.g. UE demodulation RS (DM-RS) or beam RS) may be present which may be signaled. Using this mechanism, a UE may be able to perform coarse synchronization which may not be doable by NR RS transmissions except for NR-PSS/NR-SSS. This cell may be configured as reference carrier. By this way, a network may be able to deploy one LTE cell with many neighbor NR cells without compromising UE synchronization performance considerably.

(3) Data offloading to NR cells or LTE cells

Depending on blank resource configurations, load, etc., a UE supporting both LTE and NR may be configured with two cells in the same frequency with NR and LTE. A UE may be configured for receiving control from either cell and data from either cell. The data and/or control may be transmitted from one or two cells dynamically. The benefit of this approach is to allow low latency so that UEs may be served regardless of invalid subframe or invalid resources. For example, one approach is to use different subframe location of two RAT types for "always-on" signals such as synchronization signals so that a UE can be still scheduled with data in those resources at least from one cell. This may be partially supported by allowing CoMP operation between LTE and NR cells. Different from legacy LTE CoMP, legacy CRS assumption may be changed depending on the RAT type of each participating CoMP cell. To enhance the performance of legacy CRS reception, optionally zero-power CRS may be used for neighbor NR cells.

(4) Group or cell-specific data/control transmission via LTE and UE-specific control/data transmission via NR Another approach to support coexistence or tight interworking between LTE and NR is to utilize omni-directional transmission of LTE and directional/beamforming transmission of NR. For example, to dynamically change and indicate the beam direction, LTE carrier may be utilized to indicate such signals. One example is to utilize the same numerology with two different antenna transmission mechanisms in different frequency (which may be operated by different cell or eNB), and omni-directional transmission may indicate necessary information for beam-formed transmission including broadcast information, beam-scheduling information, etc. Another example is to perform initial access via LTE cell and aggregate NR which may be used after RACH procedure. This is similar to anchor carrier and handover to additional carrier where anchor carrier may or may not be operated in parallel with handover carrier or additional carrier. If this is applied, NR cell may not transmit any cell common signals or optionally turn off such signals.

Handling UEs supporting only NR according to an embodiment of the present invention. So far, mechanisms to handle UEs supporting LTE were discussed. However, UEs may not aware of LTE or may not support LTE and NR simultaneously at the same frequency. In this case, for efficient usage of spectrum, the following operations may be considered.

(1) Case 1: UE transmission at low frequency, reception at high frequency (low frequency may be below 6 GHz, and high frequency may be above 6 GHz, e.g. 2 GHz/28 GHz)

(2) Case 2: UE transmission at low frequency, reception at high/low frequency (3) Case 3: UE transmission at low/high frequency, reception at high frequency (4) Case 4: UE transmission at low/high frequency, reception at high/low frequency For each case mentioned above, related issues will be discussed below.

FIG. 8 shows an example of timing advance issue. If a UE uses different UL frequency compared to DL frequency and a UE does not have any connection to the DL frequency as in Case 1 or 2 described above (e.g. DL at low frequency and UL at high frequency), timing advance (TA) computation may become a bit challenging. Referring to FIG. 8, if a UE receives DL from micro and transmits UL to macro, propagation delay between two may be different. If timing advance computed by macro is forwarded by micro, it may include 2 times of propagation delay between macro and UE, whereas UE's DL timing is based on propagation delay between micro and UE.

FIG. 9 shows an example of timing misalignment between micro and macro. Referring to FIG. 9, if propagation delay between micro and UE is almost zero, by applying TA from macro, the actual arrival time may be faster than the expected. However, it is difficult to estimate the propagation delay between micro and macro, unless the UE also transmits some reference signal such as PRACH/sounding reference signal (SRS).

To address the above issue, at least one of the following approaches may be considered.

(1) Use extended or longer CP for UL transmission: To compensate unknown propagation delay between micro and UE, longer CP may be used for UL transmission.

(2) Assume propagation delay between micro and UE is almost zero: Assuming small coverage of micro, propagation delay is very small. In this case, timing advance may be adjusted by macro or micro (i.e. instead of utilizing 2*propagation delay as TA, propagation delay may be set as TA).

(3) Estimate propagation delay by overhearing UE signal at micro: Another approach is to overhear the signal transmission from the UE at micro to detect propagation delay. Based on the information, TA from macro may be adjusted at micro before forwarding to the UE.

(4) Receive DL signal at the same frequency or paired spectrum or a reference carrier to acquire synchronization for UL transmission: For example, a UE may also support DL reception capability (only synchronization signals and/or reference signals, i.e. RF capability, may be equipped whereas baseband capability may not be supported to read both carriers) at the DL frequency corresponding to the UL frequency. The network may configure the reference carrier where synchronization should be performed for UL transmission. In other words, reference carrier for synchronization can be different between UL transmission and DL reception, and may be separately configurable. The UE only receives signals related to synchronization, and perform UL synchronization on the reference carrier. TA may be applied based on the timing tracked by the reference carrier for UL transmission.

(5) Estimate the propagation delay based on UE location information: Once estimation is done, either macro or micro may send the adjusted TA.

Frequency/timing offset according to an embodiment of the present invention. Another issue of coexistence of LTE and NR in the same frequency is to handle frequency/timing offset. Frequency/timing offset measured by UE at DL frequency may not be sufficient for UL frequency. Also, different pathloss between DL and UL may be an issue when DL and UL frequency are different from each other.

Even when two gNBs are collocated, if the used frequency spectrum is very different and/or numerology used in each frequency is different, frequency offset may impact UL transmission. For example, if DL frequency is 28 GHz and the requirement of frequency offset is 0.1 ppm, then generally a UE may have about 2.8 kHz carrier offset. When subcarrier spacing is large, this frequency offset may not be a big issue. However, when UL transmission in low frequency uses smaller subcarrier spacing, the overall frequency offset corrected by DL frequency may not be sufficient. For example, 2.8 kHz frequency error becomes about 1.5 ppm. This may affect sampling offset so that overall demodulation/detection performance at gNB can be degraded.

To mitigate the above issue, the following approaches may be considered.

(1) Reduce frequency offset in DL frequency: By utilizing smaller subcarrier spacing, tracking RS may be transmitted. Based on tracking RS, a UE may increase its tracking performance such as up to 0.01 ppm, so that it can be used for UL spectrum without major issue.

(2) Transmit DL tracking RS in the corresponding DL spectrum for UL spectrum: A UE may also support DL spectrum which corresponds to UL spectrum. Accordingly, a UE may receive at least tracking RS from DL carrier. When a UE is attaching to a cell, the network may indicate its corresponding UL carrier, and DL carrier for tracking purpose. When tracking DL carrier is configured, the configuration of tracking RS transmission such as SS block and/or wideband RS and/or CSI-RS may also be indicated. More generally, this may be described that a reference DL carrier may be defined for a UL carrier. The reference DL carrier may be different from serving DL frequency or DL frequency where SS block has been detected. The reference DL carrier for synchronization for UL may be either NR DL carrier or LTE DL carrier. A UE needs to support either LTE or NR (or both) at the corresponding DL carrier for a UL carrier.

In order not to mandate a UE to support corresponding DL carrier for UL spectrum sharing, another approach is to allow a UE to support other DL carrier if the network also supports the DL carrier. Based on the supported capability from a UE, the network may determine reference DL carrier which may be same or different from corresponding DL carrier for a UL carrier. The serving DL carrier or DL carrier where SS block has been detected may be configured as reference DL carrier as well, if the network can ensure the tracking performance. One example is to configure DL and UL separately where the gap is not significant (e.g. DL at 3.5 GHz and UL at 1.8 GHz). Also, the network may indicate whether DL carrier utilizes LTE or NR for tracking purpose. A UE supporting LTE may acquire time/frequency tracking from LTE carrier as well.

To overcome this issue, robust modulation such as quadrature phase shift keying (QPSK) may be used for UL transmission when frequency offset for UL is relatively high. Or, a UE may acquire time/frequency tracking from a DL carrier which may result in sufficiently accurate time/frequency tracking. For example, if a UE supports LTE in the paired DL spectrum/carrier corresponding to the configured UL spectrum, instead of relying on NR DL for time/frequency tracking for UL carrier, a UE may utilize tracking RS (such as PSS/SSS/CRS) from LTE carrier.

Similar mechanism may also be possible for pathloss estimation. The network may also configure DL carrier for pathloss estimation for a given UL spectrum if the current DL spectrum is not desirable for UL spectrum pathloss measurement. The reference DL carrier may not have to be configured to the UE or activated to the UE. In other words, a UE may only acquire time/frequency tracking and/or pathloss estimation from the reference DL carrier. This may be regarded as additional measurement and a UE may also measure pathloss and/or time/frequency tracking based on the current DL carrier regardless of this configuration. If this is configured for a given UL, time/frequency tracking from the reference DL carrier (and also pathloss estimation) may be used for UL transmission. The reference DL carrier may be configured by UE-specific higher layer signaling or cell-specific signaling such as via PBCH or SI.

(3) A UE may initiate cell association only via corresponding UL spectrum for any DL. From a cell association perspective, the gap between DL and UL spectrum may follow typical FDD and TDD gap. Once a UE is connected to the carrier, the network may indicate to the UE to switch to different UL spectrum which may have different duplex gap, and may be in totally different frequency band/range. To support this, a UE may be indicated with PDCCH order, which contains UL frequency where PRACH is attempted. When the network receives PRACH transmission from the UE, the network may perform frequency/time tracking so that the network acquires time/frequency offset of the UE. The offset value may be responded to the UE via RAR or corresponding messages so that a UE can tune its time/frequency. Periodic time/frequency tracking may also be done based on SRS and/or DM-RS transmission from the UE.

(4) A UE may not be configured with DL and UL which may cause considerable time/frequency tracking performance gap. When such case is considered, the network may use larger subcarrier spacing for UL transmission as well. To compensate delay spread or channel conditions, extended CP may also be used. Thus, if the cell supports high frequency DL/low frequency UL paring for initial access procedure as well, the numerology and need of extended CP from Msg3 may be indicated via RACH configuration.

(5) A network may perform tracking based on the received RS or PRACH from a UE. The detected offset may be informed to the UE for correction. For better tracking, UE-dedicated resource for tracking RS transmission may be considered.

Pathloss compensation according to an embodiment of the present invention is described. When DL and UL frequency is very different, pathloss may also be very different which may lead difficulty in power control, particularly for open-loop power control. To mitigate this issue, the following approaches may be considered.

(1) Option 1: UE-specific carrier frequency change (UE supports NR UL corresponding to NR DL as well as UL sharing spectrum)

NR DL f1 (assume paired or unpaired at f2 or f1 for NR f1 frequency), NR UL f3
Pathloss measure from f1
PRACH transmission via f2 or f1 following PRACH configuration in f2 or f1
TA adjustment via RAR
PDCCH order on f3 UL spectrum
gNB measures pathloss offset & TA offset and indicate pathloss offset which will be used for power control. In addition to pathloss, the offset may be added for UL power control.

(2) Option 2: Cell-specific NR DL-UL shared NR UL pairing

The network may know the offset between DL and UL. Accordingly, the network may indicate the pathloss offset to UE via UE-specific signal or via RACH configuration.

Alternatively, when a UE transmits PRACH, the network measures potential pathloss based on the power used for PRACH. For this, the power level at UE may be indicated in PRACH configuration. Or, after initial access, pathloss compensation may be initiated via PDCCH order or other request where the requested power used at the UE may be explicitly indicated. Or, SRS may be used to increase or decrease UE power based on closed-loop. For open-loop power control, pathloss difference may be measured based on explicit PRACH or UL transmission according to the indicated power level. After measuring the offset, the network may indicate the offset so that it may be added to the power control computation.

Initial access according to an embodiment of the present invention is described. In terms of utilizing DL (f1) and UL (f3) spectrum in different frequency bands, it may be categorized into three categories as follows. Here, it may be assumed that corresponding UL spectrum for f1 is f2.

(1) Only RRC connected UE can access UL spectrum f3.
(2) RRC connected and inactive UEs can access UL spectrum f3.
(3) All RRC connected/IDLE UEs can access UL spectrum f3.

In terms of band definition, the following bands may be considered by Table 1.

TABLE 1

|  | DL spectrum | UL spectrum |
| --- | --- | --- |
| Band X | f1 | f3 |
| Band Y | f1 | f2 |

If bands are defined as above, a UE may support either Band X or Band Y or support both bands. The supported band may be indicated to the network. If there is possibility that a UE may support only Band X, either the network may support initial access on both Band X and Band Y simultaneously, or the UE may access Band X only via SCell attachment or secondary cell group (SCG) attachment (so that PCell or master cell group (MCG) can configure necessary resources for pathloss/frequency offset estimation).

For each case, different initial access procedure may be considered as follows.

(1) Only RRC connected UE can access UL spectrum f3

In this case, a UE may perform initial access at f1 and f2. Once a UE is connected, a UE may be reconfigured to different UL frequency via PDCCH order or other procedure such as RRC reconfiguration of UL spectrum. At reconfiguration, the bandwidth configuration, and UL center frequency, etc., may be configured. In this case, it may also be possible to maintain two ULs instead of shutting off UL at f2. The benefit of maintaining f2 is to support channel reciprocity via SRS/DM-RS transmission. A UE may transmit control and/or data via f2 and/or f3. To support this, configuration of DL carrier and UL carrier may be separately performed, and activation/deactivation may also be performed independently between DL and UL carrier. Even for unpaired spectrum, independent activation/deactivation of DL/UL carrier may be considered. A UE may switch to f2 when it becomes IDLE or inactive states.

(2) RRC connected and inactive UE can access UL spectrum f3

Different from (1), a UE may keep UL spectrum information in inactive state. If a UE is configured with more than one UL spectrum (e.g. f2 and f3), the UE may keep f2 instead of f3 if it goes to inactive state. For UEs supporting only one UL (e.g. f3), initial access procedure via f1 and f3 may be necessary.

(3) All RRC connected/IDLE UEs can access UL spectrum f3

To support initial access at f3, PRACH configuration may include resources.

Assuming there are UEs supporting only Band X or Band Y, PRACH resource on both f2 and f3 may be necessary. In other words, multiple PRACH configurations in different uplink frequency may be needed. PRACH configuration includes at least one of the followings.

Frequency or center frequency of UL carrier or PRACH resources including frequency location: The frequency location may include band information and offset between PRACH resource and center of the band or offset between PRACH resource and the expected center of UL frequency corresponding to DL frequency or center or SS block. For example, if a fixed DL-UL gap is assumed per frequency band, depending on the location of SS block or center of DL carrier, the center or reference location of UL carrier may be assumed as the reference point for DL carrier+fixed DL-UL gap, and PRACH resource may be configured based on the PRB indexing centered or based on the reference UL frequency or offset between PRACH resource and the reference point. When center of band is used for a reference point for DL carrier for PRB indexing, the maximum number of RBs in the carrier may be defined by the size of band.

Numerology used for PRACH transmission: The timing between PRACH transmission in supplemental UL (SUL) carrier and RAR transmission in DL carrier on f1 may be different from the timing between PRACH transmission in UL carrier on f1 (or on F2 in case of FDD) and RAR transmission in DL carrier on f1. To maintain the same timing for RAR, RAR timing may be determined based on DL carrier's numerology used for RAR transmission from the end of PRACH transmission (or the end of slot where PRACH has been transmitted).

Numerology used for Msg3 transmission: Numerology used for Msg3 (if different PRACH) may be configured or defined per frequency band or configured in PRACH configuration. Timing for Msg3 transmission may follow the numerology used for Msg3 transmission.

Another approach for delivering best beam information is to transmit PRACH to both UL carriers simultaneously. Alternatively, to configure SUL, the number of transmission beam may not be so large so that either beam-based resource may be configured or RAR may be transmitted via multiple beams. Or, SUL may be configured only when DL carrier does not use multiple beams. When PRACH are transmitted simultaneously, the relationship between two may be predefined (i.e. the resources between f1 (or f2 in FDD) UL and SUL PRACH resources) or configured explicitly, so that the network can determine whether two transmissions are from the same UE. From the UE perspective, it is possible that UE is in power limited case, thus, transmission may be done in sequential manner instead of simultaneous transmission.

When multiple PRACH resources at different UL frequency are configured, a UE may select its PRACH resource based on at least one of the followings.

UE capability: Whether a UE supports Band X or Band Y or supports both

UE reference signal received power (RSRP) measurement: If RSRP is low (compared to a threshold), the UE may select f3 for better coverage. Otherwise, the UE may select f2 for less complexity.

UE mobility: Depending on UE mobility, the UE may select different UL frequency

When a UE supports both UL spectrum, and the network supports both UL frequencies, when beam failure occurs, the UE may transmit beam failure recovery request via f3 instead of f2 to enhance the reliability. In other words, when a UE needs to perform beam sweeping for UL transmission, a UE may switch to f2 for fast transmission, low overhead, and better reliability.

In this case, beam correspondence between DL and UL may not be assumed. To support the operation, the following approaches may be considered.

There may be only one beam for PRACH transmission, so that single PRACH configuration is used. PRACH configuration carried in each SS block may be identical. A UE needs to inform best beam index of DL as beam pairing cannot be achieved via RACH procedure. The best beam index may be used for RAR transmission. To indicate best beam index, different approach may be considered: (1) PRACH may carry data to indicate best beam, (2) PREABMLE sequence or PRACH resource may be selected according to best beam. If the network configures different PRACH resource corresponding to each beam, a UE may select PRACH resource to inform the best beam. This may imply that the network needs to configure multiple PRACH resources for multiple DL beams. Alternatively, RAR transmission may also occur over multiple beams. In PRACH transmission, the network is not aware of the best beam for DL. After sending RAR over multiple beams, the best beam may be reported in Msg3. After that, the best beam may be used for DL transmission. If the receiver beam is multiple, the repetition of PRACH resource may be configured and a UE may repeat its PRACH transmission for the configured numbers.

There may be multiple beams for PRACH transmission and a UE may need to transmit PRACH multiple times as beam pairing may be different in f2 and f3. To allow this, more than one resource for PRACH transmission may be configured. Or, a UE may change its beam per attempt. If more than one resource for PRACH transmission is configured, the number of PRACH configurations may be indicated by the network in PRACH configuration. If the receiver beam is multiple, the repetition of PRACH resource per PRACH transmission with single beam direction may be configured and a UE may repeat its PRACH transmission for the configured numbers. The selected beam for UL transmission may be indicated in RAR for Msg3 transmission.

FIG. 10 shows an example of a case that PRACH does not carry best beam information according to an embodiment of the present invention. In this case, beam recovery may need to be performed for DL and UL (by UE and network respectively) due to different frequencies. For beam recovery and measurement, a UE may transmit beam-sweeping RS (e.g. SRS or DM-RS) periodically by network configuration. A UE may perform beam tracking/management based on DL RS (e.g. SS block, CSI-RS, etc.).

To mitigate the impact from DL/UL asymmetry, it is desirable that a UE may be configured with additional UL at f3 for coverage purpose. Or, UL at f3 may be configured to UEs with coverage issue only. In other words, UL at f3 may be configured only at RRC-connected states.

In summary, when a UE support a band combination of DL and UL in different frequency band, the following two approaches may be considered in terms of UE capability. A band combination of DL carrier on f1 and UL carrier on f2 may be called as UL-sharing-band.

(1) A UE may support DL carrier on f1 and UL carrier on f1 (or paired UL spectrum if f1 is FDD band) as well, when the UE supports DL carrier on f1 and UL carrier on f2. In other words, a UE may support NR DL/UL carrier in NR spectrum, and may support NR DL/UL carrier in NR/LTE band combination.

(2) A UE may support DL carrier on f1 and UL carrier on f1 (or paired UL spectrum if f1 is FDD band), or DL carrier on f1 and UL carrier on f2 or both. It may be up to UE capability whether to support one or both of band combinations.

If the first approach is used, initial access procedure may be designed assuming that a UE initially access NR carrier via NR DL/UL combination in NR spectrum. This may allow mechanisms for a UE to handle time/frequency offset, and pathloss differences. In other words, if the first approach is used, mechanisms to alleviate time/frequency offset and pathloss difference may be initiated for RRC_CONNECTED UEs, and f2 UL may be configured to a UE after initial access.

If the second approach is used, initial access procedure may need to support different UEs which may require multiple PRACH configurations in different frequency range, and also need to handle time/frequency offset and pathloss differences from the beginning. If this is supported, supporting time/frequency offset tracking and pathloss estimation from different DL carrier from NR DL carrier may be preferred. This implies that a UE needs to support at least time/frequency tracking and pathloss estimation on the paired DL (or same f2) carrier corresponding to UL carrier.

Various aspects of SUL is described in detail according to an embodiment of the present invention.

FIG. 11 shows an example of scenarios for SUL according to an embodiment of the present invention. In FIG. 11, LTE band uses relatively lower frequency, and NR band uses relatively higher frequency (e.g. 3.5 GHz). FIG. 11-(a) shows a case of stand-alone SUL. In this case, a UL carrier in the LTE band is used as a supplemental UL carrier for NR. The supplemental UL carrier for NR corresponds to NR DL/UL carrier in the NR band. FIG. 11-(b) shows a case of dual connectivity SUL. In this case, a UL carrier in the LTE band is divided into LTE UL carrier and supplemental UL carrier for NR, and the supplemental UL carrier for NR corresponds to NR DL/UL carrier in the NR band. The LTE UL carrier and the supplemental UL carrier for NR in the LTE band may be divided by TDM or FDM.

To support SUL operation, multiple PRACH configurations may need to be indicated. If stand-alone SUL is supported, PRACH configuration may need to be informed via remaining system information (RMSI). A UE may select PRACH resource based on UE capability (e.g. whether a UE supports SUL or not) and RSRP like radio resource management (RRM) measurement. Furthermore, there may be a couple of issues to be addressed as follows.

(1) PRACH power determination: Different power configuration, e.g., TargetReceivedPower, may be configured per each PRACH resource to address pathloss difference in different frequencies.

(2) Handling of NR TDD/FDD UL carrier when SUL carrier is selected in RACH procedure: Another issue is whether to allow simultaneous transmission between NR TDD/FDD UL carrier and SUL carrier or either one is selected. As one of the main motivation of SUL is to handle asymmetric coverage between DL and UL, there is not a strong motivation to allow simultaneous transmission between NR TDD/FDD UL carrier and SUL carrier. A UE may select one frequency based on RRM measurement, and may stay until it changes its UL frequency via RACH procedure again or configured to change by higher layer. Thus, simultaneous transmission or dynamic switching between two UL frequencies when SUL is applied may not be allowed. When a UE stays on one carrier by selecting at RACH procedure, it means that a UE is configured to transmit PUCCH if the corresponding DL is primary carrier. When a UE is configured with SUL, the followings may be considered.

If a UE is configured with only one carrier in which SUL carrier is configured, a UE may transmit PRACH/PUCCH to both UL primary component carrier (PCC) and SUL carrier if SUL carrier is selected for PRACH transmission. It means that a UE transmits PRACH to UL-PCC as well, and then the UE may be configured with two PUCCH groups or cell groups and SUL carrier may be a PUCCH cell in one cell group. However, there may be only one DL for PUCCH transmission so that either one PUCCH cell may be used for PUCCH transmission at a given time. Indication of PUCCH transmission may be semi-statically configured or dynamically indicated by DL scheduling. Or, a UE may assume that UL-PCC may be changed to a cell transmitting PRACH. In other words, in terms of UL-PCC, flexible paring between DL-PCC and UL-PCC in different bands may be supported. Or, A UE may assume that UL-secondary component carrier (SCC) may be configured with PUCCH cell and a UE may assume that UL-PCC may not carry PUCCH. UL-PCC may be still active to transmit PRACH and/or SRS. UL-SCC for PUCCH transmission may be semi-statically configured or dynamically indicated by DL scheduling. In case of dynamic indication, depending on the PUCCH cell, the timing and PUCCH format, and necessary PUCCH parameters may be differentiated. Or, a UE may be configured with SUL carrier only for non-PCC carrier.

When PUCCH cell is configured to one carrier among UL-PCC (paired or same to DL-PCC depending on FDD or TDD spectrum) and SUL carrier, PUSCH transmission may follow PUCCH cell and restricted to the PUCCH cell or may be semi-statically configured to another carrier different from PUCCH cell or may be dynamically indicated via UL grant. In case of dynamic indication, the timing difference or timing application of PUSCH transmission may follow the carrier where PUSCH is transmitted.

(3) PDSCH-HARQ-ACK and PDCCH-PUSCH timing: It has been agreed to allow dynamic or semi-static indication of timing for HARQ-ACK and PUSCH transmission. When DL and UL use different numerologies and thus different slot sizes, the reference timing to apply timing values should be determined. The following approaches may be considered.

FIG. 12 shows an example of PDSCH-HARQ-ACK and/or PDCCH-PUSCH timing according to an embodiment of the present invention.

Approach 1: FIG. 12-(a) corresponds to Approach 1. Timing may be determined based on SUL carrier's slot. For example if PUSCH timing is 1 after PDCCH, the next slot to the slot which overlaps with DL slot of PDCCH may be used for PUSCH transmission. In other words, the timing may be determined based on the numerology used in SUL carrier or the carrier where PUCCH or PUSCH is transmitted.

Approach 2: FIG. 12-(b) corresponds to Approach 2. Timing may be determined based on DL carrier's slot. Timing may be applied based on DL carrier's slot and UL transmission may occur at the start of SUL carrier's slot (i.e. next available SUL carrier's slot if timing is in the middle of SUL carrier's slot).

Approach 3: FIG. 12-(c) corresponds to Approach 3. Timing may be determined based on DL carrier's slot (or UL transmission) and UL transmission may occur using mini-slot. Instead of delaying the transmission to the next available UL slot, mini-slot scheduling may be used. However, this may not work between certain numerologies (e.g. 60 kHz and 15 kHz) as SUL carrier's slot may not be equally dividable to DL carrier's slots. To handle this approach, mini-slot structure with uneven mini-slot duration may be considered. Alternatively, the closest next mini-slot aligned with the timing based on DL carrier's slot or mini-slot based indication of timing based on UL carrier's slot may be considered. For example, if mini-slot based approach is used, if timing is 2, the closest mini-slot after 2 slots of DL carrier's slot may be used for PUCCH transmission. Similar mechanism may be realized by using UL slot's numerology for timing determination with mini-slot level or OFDM symbol level indication of timing.

Nonetheless, the similar/same approach of cross-carrier scheduling and UCI transmission between two different carriers with different numerologies may also be used to handle SUL scenario as well.

(4) Dual connectivity scenarios: when a UE is configured with dual connectivity where LTE UL and NR UL are shared via TDM, same handling to single active UL may be necessary. When LTE and NR shares the spectrum via FDM, UE hardware requirement needs to be clarified. Depending on UE RF structure, further constraints such as UL timing difference and waveform may exist.

When more than two UL carriers are configured corresponding to one DL carrier, or more than two UL carriers are in one UL carrier group, PUCCH may be transmitted in one of them. To support PUCCH switching, the following approaches may be considered.

Semi-static configuration of PUCCH cell: A PUCCH cell may be changed via RRC or MAC CE or dynamic configuration. To handle ambiguity, particularly when different numerology is used between two UL carriers, the network may be expected to perform blind detection on both resources based on each one's timing (i.e. based on each PUCCH carrier's numerology). Alternatively, PUCCH cell may be indicated dynamically as if it is one of the PUCCH resource where the timing is determined based on PUCCH's numerology. For example, when there are two PUCCH cells where a UE is configured with 15 kHz subcarrier spacing and 60 kHz subcarrier spacing in each PUCCH cell for PUCCH transmission, if PUCCH A (with 15 kHz subcarrier spacing) is dynamically indicated, the timing may be determined based on 15 kHz numerology. On the other hand, if PUCCH B (with 60 kHz subcarrier spacing) is dynamically indicated, the timing may be determined based on 60 kHz numerology.

Dynamic configuration of PUCCH cell: Another approach is to treat PUCCH cell like a frequency resource and the PUCCH cell may be dynamically indicated as mentioned above.

For PUSCH piggyback, the following approaches may be considered.

Explicit piggyback indication and carrier indication: One approach is to indicate whether the piggyback is expected for the given HARQ-ACK feedback, and if so, the carrier index or bandwidth part (BWP) index may be indicated. A UE may expect UL grant in the indicated resource. The timing may be determined based on PUCCH numerology or numerology of PUSCH where piggyback may occur.

Timing of HARQ-ACK may be determined based on PUCCH numerology. OFDM symbol or slot level indication may be used. If OFDM symbol level indication is used, piggyback may occur in any PUSCH in the overlapped OFDM symbol(s) with the original starting PUCCH symbol. In other words, actual piggyback position may be same as the start of PUCCH transmission. If slot level indication is used, piggyback may occur in the first transmission which overlaps with the PUCCH transmission. If symbol level indication is used, for example, if PUCCH numerology is 15 kHz, and there are PUSCH with 60 kHz of 7 symbols is scheduled, the overlapped 60 kHz symbol to the first symbol of PUCCH transmission may piggyback HARQ-ACK.

For CSI feedback, depending on the granularity of periodicity (e.g. slot or symbol level), different handling may also be considered. Slot level piggyback may follow the first transmission which overlaps with the PUCCH (for CSI) slot, and symbol level piggyback may follow the same OFDM symbol(s) for piggybacking.

For half-carrier shift, it has been discussed whether to allow half-carrier shift in NR UL when it shares with LTE UL spectrum. If half-carrier shift is adopted either by indicating UL center with 7.5 kHz shift or by baseband processing, in addition to BWP configuration, UL center frequency may need to be indicated. This information may be either configured with PRACH configuration or indicated in RAR.

For single active UL, it has been agreed to support one active UL carrier at a given time for NR non-stand-alone operation. To support this, the following approaches may be considered.

(1) UL resources may be semi-statically partitioned between NR and LTE and UL transmission to each RAT may occur at the assigned UL resources respectively.

(2) UL resources may be dynamically used between NR and LTE based on scheduling and priority based on UCI type and/or CG. Another approach is to allow dynamically select which UL transmission to adopt in each UL resource. To handle potential collision case, priority rule based on such as UCI type and CG may be necessary as full collision avoidance by the scheduling may not be easily feasible due to different processing time in each CG.

(3) NR and LTE dual connectivity may be handled like CA, so that UCI aggregation and data may be aggregated between two CGs.

For semi-static resource partitioning, the simplest approach to support single active UL is to divide resources between LTE and NR. Given LTE requires subframe-based transmission, a subset of subframes may be assigned to NR and other subframes may be assigned to LTE. If there is scheduled LTE UL transmission such as PUCCH or PUSCH in a subframe assigned to NR, a UE may drop the channel regardless whether there is NR UL transmission. To minimize the dropping, one approach is to configure reference HARQ timing. For example, for FDD, HARQ timing from FDD-TDD CA with primary cell frame structure type is 2 may be used and TDD DL/UL configuration with the same set of UL may be selected. For example, if UL subframes 2, 3, 4, 7, 8, 9 are assigned for LTE, DL/UL configuration 0 may be used for HARQ-ACK timing with FDD-TDD CA. For PUSCH, regular timing may be used and scheduling may avoid collision. In other words, FDD-TDD CA framework may be used for HARQ-ACK timing for LTE FDD to minimize HARQ-ACK dropping when semi-static partitioning is used.

If LTE TDD carrier and NR FDD carrier are dual connected, NR UL carrier may be restricted to non-LTE UL subframes. If LTE TDD carrier and NR TDD carrier are dual connected, by shifting frame boundary of NR, the overlapping of NR and LTE UL may be minimized.

When semi-static resource partitioning is used, some consideration of different TA value may need be addressed. For example, if TA of LTE is larger than TA of NR, one or a few OFDM symbols of NR subframe may need to be yielded to LTE for TA handling.

As semi-static resource partitioning may not be efficient if traffic change dynamically or there is underutilized RAT, dynamic resource partitioning may be considered. That is, dynamic UL resource sharing may be used where each subframe may be assigned to each RAT as a primary CG. If there is no transmission on the assigned primary CG, the resource may be used for the secondary CG. When dynamic UL resource sharing is used, different processing time due to numerology and TTI lengths should be taken into account. For example, if LTE is configured with short TTI such as 2 symbols sTTI operation, UL transmission may be triggered within a subframe. Unless processing time and TTI are equal between two RATs, it is difficult to fully anticipate UL transmission in a given resource by the other CG. Thus, when dynamic UL resource sharing is considered, the CG with faster processing time and/or shorter TTI may be allowed to steal UL resource if there is no scheduled UL transmission by primary CG. For example, if short TTI operation is not configured, NR with faster processing may use unused resources by LTE.

Alternatively, resource sharing may be used between two RATs and collisions may be handled based on priority rule. For example, short UL transmission may have higher priority than long UL transmission. Or, transmission including UCI may have higher priority than transmission without UCI. When collision occurs, the lower priority channel may be dropped either partially or fully. Similar techniques used in UL channel collisions for short TTI operation may be considered.

NR SS block transmission when LTE/NR share DL carrier according to an embodiment of the present invention is described. In terms of DL carrier sharing between LTE and NR, the following approaches may be considered.

NR and LTE may be fully overlapped. NR may utilize multicast broadcast single frequency network (MBSFN) subframes and non-CRS OFDM symbols in normal subframes.

NR and LTE may be partially overlapped. NR may utilize MBSFN subframes and non-CRS OFDM symbols of LTE carrier, while it may also utilize FDM with LTE carrier in normal subframes.

NR and LTE may not be overlapped and NR and LTE are multiplexed by FDM.

For the case of third, there is no issue with SS block transmission as long as NR bandwidth is larger than the SS block bandwidth and/or UE minimum bandwidth for RMSI transmission. For the second case, as long as FDM portion of NR carrier is sufficiently large to accommodate RMSI and/or SS block, there is no issue with SS block transmission. In other cases (case 1 or case 2 with smaller bandwidth), NR SS block may be transmitted in two different manner as follows.

(1) SS block may be transmitted only in MBSFN subframes.

(2) SS block with different numerology (such as 30 kHz subcarrier spacing) may be transmitted in mini-slot in normal subframe and/or MBSFN subframes.

For approach (1), the specification may define relative location of SS block in a slot (and/or across slots) based on SS block numerology, instead of absolute slot index or subframe index, so that SS block may also be placed in MBSFN subframes or placed in OFDM symbols without LTE CRS. For initial access of stand-alone UEs or RRC_IDLE UEs, SS block transmission may not be punctured by MBMS services. For SS block which may be indicated to UEs via signaling to avoid collision with MBMS services, it may be indicated that reserved resource may include MBMS subframes where MBMS is actually transmitted, and SS block may not be transmitted in such MBMS subframes or reserved resources. This reserved resource may be separately configured for reserved resource for data and for SS block (this may also include RMSI and related initial access procedure transmission).

The possible scenarios of DL sharing between LTE and NR may include FDM, TDM, and FDM+TDM in different subframe. When FDM is used, NR carrier and LTE carrier may not share the frequency. Thus, transmission of SS block may be performed equally to other NR carrier as long as the bandwidth of NR carrier exceeds the required minimum bandwidth for SS block transmission. When TDM is used, to avoid CRS OFDM symbols by NR signals, it is challenging to transmit SS block in LTE normal subframes. One approach is to transmit SS block in MBSFN subframes. If SS blocks are transmitted in a defined set of subframes/slots, LTE and NR frame boundary may be shifted so that SS block may be transmitted in LTE MBSFN subframes. eNB and gNB may exchange information about MBSFN subframes via backhaul signaling. In this case, offset between two may also be needed. For that, system frame number (SFN) or subframe index may be further indicated.

FIG. 13 shows an example of SS block transmission in NR carrier according to an embodiment of the present invention. Referring to FIG. 13, as MBSFN subframe uses 2 OFDM symbols for LTE PDCCH, if SS block is placed OFDM symbols 3 to 6, there is no room for RMSI control resource set (CORESET) in the first slot of MBSFN subframe. Thus, it may be considered to utilize 7 OFDM symbols slot for RMSI transmission or mini-slot transmission for RMSI transmission.

As there are reserved resources for RMSI CORESET, it may need to be indicated in PBCH whether there is any reserved resource in each subframe or whether LTE-NR TDM sharing is used. Alternatively, the slot size of RMSI transmission may be indicated as 7 OFDM symbols and some slots may not carry any CORESET. Further, wideband RS may not be transmitted in frequency location where CORESET is not present. Alternatively, reserved resource may be explicitly indicated in PBCH so that a UE may assume that RMSI CORESET and wideband RS may be omitted in the reserved resource. In terms of indication of slot duration, as the UE may need to know the exact location of SS block, joint indication may be possible as follows.

0: indicates that both RMSI and SS block assume 14 OFDM symbol slot length.

1: indicates that both RMSI and SS block assume 7 OFDM symbol slot length.

2: indicate that RMSI uses 7 OFDM symbol slot length whereas SS block uses 14 OFDM symbol slot length.

3: indicate that RMSI uses 14 OFDM symbol slot length whereas SS block uses 7 OFDM symbol slot length.

Alternatively, slot length of each SS block and RMSI may be indicated separately. Alternatively, the mapping pattern of SS block may be indicted, and RMSI CORESET configuration may also be indicated separately which may include time location as well.

FIG. 14 shows another example of SS block transmission in NR carrier according to an embodiment of the present invention. If LTE-NR TDM is triggered in PBCH, a UE may assume that 14 OFDM symbol slot is used for SS block and 7 OFDM symbol slot is used for RMSI transmission. Also, 2 OFDM symbols in each subframe may be reserved, and CORESET may be placed in the second slot only. This information may be indicated in PBCH or indicated by assistance information (e.g. via PCell or UE-specific signaling). When this information is known, a UE may assume that CORESET may start at 3rd OFDM symbol instead of 1st OFDM symbol of a slot even though the slot size is 14 OFDM symbols.

In other words, reserved resource for LTE PDCCH in MBSFN subframe may be indicated for RMSI transmission or RMSI may be transmitted in second slot of LTE MBSFN subframe. Alternatively, one bit may be indicated in PBCH which indicates LTE-NR TDM. If this flag is indicated, a UE may assume that at least 2 symbols in each subframe are reserved for LTE signals. Based on the information, different SS block mapping may be used. Or, different SS block mapping pattern may be used in such a case. If there is no explicit signaling, LTE-NR coexistence may be assumed that NR is deployed in LTE bands regardless of whether there is legacy LTE operating or not. In that case, even without explicit indication of LTE-NR coexistence, a UE may assume that LTE-NR coexistence cases are applied.

To ensure at least one CORESET symbol, different SS block mapping may be used. For example, 3 OFDM symbols may be reserved in each subframe for SS block mapping. In addition to LTE-NR TDM, the number of LTE PDCCH symbol may be indicated or the number of reserved symbol (either 1 or 2) may be indicated separately as well. If reserved symbol is 1 OFDM symbol, the same SS block mapping may be used. In the reserved resource, any resource element group (REG) mapping is not used. In other words, the entire duration of control region may become smaller.

When TDM/FDM multiplexing between LTE-NR is used, if RMSI CORESET/PDSCH is transmitted in LTE region via TDM, the reserved resource may need to be indicated. For this, LTE-NR-Hybrid field may be indicated or LTE-NR-TDM may be indicated even for this case. A UE may assume the same behavior to LTE-NR TDM for SS block mapping and RMSI transmission. More detailed information about reserved resource may be indicated in RMSI or in other SI or UE-specific signaling.

More generally, for CORESET configuration in LTE-NR coexistence where dynamically reserved resource may be indicated, the CORESET duration and/or CORESET starting OFDM symbol may be constructed based on the best case (i.e. 1 LTE PDCCH region) and depending on the reserved resource, CORESET duration and/or CORESET starting OFDM symbol may be dynamically changed.

UL 7.5 kHz shift indication according to an embodiment of the present invention is described. When 7.5 kHz shift is used, center frequency of the NR carrier, which may or may not be same as center of actual NR carrier, may be configured. The center of LTE carrier may be indicated. The center frequency may be indicated with 7.5 kHz shift as well.

If 7.5 kHz shift operation at baseband and/or digital rotater based on UE implementation is applied, it can be enabled by one of the followings.

A UE may assume 7.5 kHz shift around indicated center in LTE UL spectrum.

A UE may assume 7.5 kHz shift by PRACH configuration and 7.5 kHz shift+center frequency may be indicated in different PRACH resource.

A UE may assume no 7.5 kHz shift for PRACH, and RAR may indicate shift or center frequency with shifted value in RAR.

In terms of center frequency, the indicated UL frequency may be the center frequency, and the center frequency of LTE and NR may be the same for signal generation perspective.

Normal CP/extended CP multiplexing according to an embodiment of the present invention is described. When DL and UL use different frame structure, even in TDD, frame structure or slot structure between DL and UL may be different. In terms of determining timing when DL and UL utilizes different numerology, the following multiple options may be considered.

(1) Slot structure may be defined by numerology of DL.

FIG. 15 shows an example of slot type formation based on DL numerology. Extended CP symbols may be placed within UL portion aligned with the end of slot. Referring to FIG. 15, Extended CP UL symbols are placed at the end of normal CP DL slot. For example, with 30 kHz Normal CP DL numerology, if slot size is 7, the Extended CP symbols to be aligned with Normal CP DL may not be aligned with Extended CP only UL slot due to the first OFDM symbol of Normal CP with larger CP. This approach also may complicate timing between DL and UL.

(2) Slot structure may be defined by each numerology for DL and UL.

FIG. 16 shows an example of slot type formation based on DL and UL numerology. This approach is to maintain separate slot structure between UL and DL, and utilize CA framework for handling of timing such as PDSCH to HARQ-ACK and PDCCH to PUSCH. PDSCH to HARQ-ACK or PDCCH to PUSCH timing may have multiple options which requires further investigation to be finalized. One drawback of this approach is that when slot format is indicated by group common PDCCH, either separate format may be indicated in DL and UL, or slot format structure may be indicated based on the first approach. Referring to FIG. 16, individual slot structure is configured for DL and UL. When mini-slot is applied, mini-slot may be applied per DL and UL respectively with this approach.

FIG. 17 shows a method for transmitting a PRACH by a UE according to an embodiment of the present invention. The present invention described above may be applied to this embodiment.

In step S100, the UE receives multiple PRACH configurations which include a first PRACH configuration for NR DL/UL carrier in a NR band and a second PRACH configuration for a supplemental UL carrier in a LTE band. In step S110, the UE transmits at least one of a first PRACH for accessing the NR DL/UL carrier in the NL band by using a first PRACH power based on the first PRACH configuration, or a second PRACH for accessing the supplemental UL carrier in the LTE band by using a second PRACH power based on the second PRACH configuration. The first PRACH configuration and the second PRACH configuration include different PRACH power configurations.

The UE may be configured only with the supplemental UL carrier in the LTE band. In this case, a UL PCC may be changed to a cell of the supplemental UL carrier on which the second PRACH is transmitted. A DL PCC may be in the NR DL/UL carrier.

Furthermore, the supplemental UL carrier may include LTE UL resources and NR UL resources. In this case, the LTE resources and the NR resources are multiplexed by TDM or FDM. A reference HARQ timing based on FDD-TDD CA may be configured for the LTE UL resources.

Furthermore, a cell carrying a PUCCH may be configured to one of a UL PCC in the NL DL/UL carrier or the supplemental UL carrier. A PUSCH transmission may be performed in the cell carrying the PUCCH. Or, a PUSCH transmission may be configured to another carrier other than the NR DL/UL carrier or the supplemental UL carrier.

Furthermore, the UE may receive a DL tracking reference signal (RS) in a DL carrier corresponding to the NR DL/UL carrier or the supplemental UL carrier.

Furthermore, at least one of the first PRACH or the second PRACH may carry data indicating a best beam. Or, a preamble sequence or a PRACH resource may be selected to indicate a best beam.

FIG. 18 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method performed by a wireless device operating in a wireless communication system, the method comprising:
receiving (i) a first physical random access channel (PRACH) configuration for a first uplink (UL) carrier and (ii) a second PRACH configuration for a second UL carrier, wherein the first UL carrier and a DL carrier linked to the first UL carrier belong to a first carrier band, and wherein the second UL carrier belongs to a second carrier band;
performing a reference signal received power (RSRP) measurement on the DL carrier;
selecting a UL carrier for a random access procedure, among the first UL carrier and the second UL carrier, based on a result of the RSRP measurement on the DL carrier; and
performing the random access procedure on the selected UL carrier based on a PRACH configuration for the selected UL carrier,
wherein, based on that the result of the RSRP measurement on the DL carrier is less than a threshold, the second UL carrier is selected as the UL carrier for the random access procedure,
wherein, based on that the result of the RSRP measurement on the DL carrier is not less than the threshold, the first UL carrier is selected as the UL carrier for the random access procedure,
wherein the method further comprises receiving a UL grant informing a UL carrier for a physical uplink shared channel (PUSCH) transmission, and
wherein, based on that the UL grant informs a carrier switching in the random access procedure such that the informed UL carrier for the PUSCH transmission is different from the second UL carrier selected for the random access procedure, the carrier switching is prohibited.

2. The method of claim 1, wherein the first carrier band has a higher carrier than the second carrier band.

3. The method of claim 1, wherein the first carrier band is a carrier band for a 5G new radio access technology (NR), and
wherein the second carrier band is a carrier band for a 4G long-term evolution (LTE).

4. The method of claim 1, wherein the second UL carrier is supplemental UL carrier.

5. The method of claim 4, wherein the supplemental UL carrier includes LTE UL resources and NR UL resources.

6. The method of claim 5, wherein the LTE UL resources and the NR UL resources are multiplexed by time division multiplexing (TDM) and/or frequency division multiplexing (FDM).

7. The method of claim 5, wherein a reference hybrid automatic repeat request (HARQ) timing based on frequency division duplex (FDD)-time division duplex (TDD) carrier aggregation (CA) is configured for the LTE UL resources.

8. The method of claim 1, wherein a cell carrying a physical uplink control channel (PUCCH) is configured to one of the first UL carrier or the second UL carrier.

9. The method of claim 8, wherein a physical uplink shared channel (PUSCH) transmission is performed in the cell carrying the PUCCH.

10. The method of claim 8, wherein a PUSCH transmission is configured to a UL carrier that is different from a UL carrier to which the cell carrying the PUCCH is configured.

11. The method of claim 1, further comprising receiving a DL tracking reference signal (RS) in the DL carrier.

12. The method of claim 1, wherein the random access procedure carries data indicating a best beam.

13. The method of claim 1, further comprising:
selecting a PRACH resource based on the PRACH configuration for the selected UL carrier,
wherein the PRACH resource is selected to indicate a best beam.

14. The method of claim 1, wherein the wireless device is configured to communicate with at least one of a wireless device, a network, and/or autonomous vehicles other than the wireless device.

15. The method of claim 1, wherein all uplink transmissions during the random access procedure are performed on the selected UL carrier based on that the second UL carrier is selected as the UL carrier for the random access procedure.

16. A wireless device configured to operate in a wireless communication system, the wireless device comprising:
a memory;
a transceiver; and
at least one processor, operably coupled to the memory and the transceiver, configured to:
control the transceiver to receive (i) a first physical random access channel (PRACH) configuration for a first uplink (UL) carrier and (ii) a second PRACH configuration for a second UL carrier, wherein the first UL carrier and a DL carrier linked to the first UL carrier belong to a first carrier band, and wherein the second UL carrier belongs to a second carrier band,
perform a reference signal received power (RSRP) measurement on the DL carrier,
select a UL carrier for a random access procedure, among the first UL carrier and the second UL carrier, based on a result of the RSRP measurement on the DL carrier; and
perform the random access procedure on the selected UL carrier based on a PRACH configuration for the selected UL carrier,
wherein, based on that the result of the RSRP measurement on the DL carrier is less than a threshold, the second UL carrier is selected as the UL carrier for the random access procedure,
wherein, based on that the result of the RSRP measurement on the DL carrier is not less than the threshold, the first UL carrier is selected as the UL carrier for the random access procedure,
wherein the at least one processor is further configured to control the transceiver to receive a UL grant informing a UL carrier for a physical uplink shared channel (PUSCH) transmission, and
wherein, based on that the UL grant informs a carrier switching in the random access procedure such that the informed UL carrier for the PUSCH transmission is different from the second UL carrier selected for the random access procedure, the carrier switching is prohibited.

17. The wireless device of claim 16, wherein all uplink transmissions during the random access procedure are performed on the selected UL carrier based on that the second UL carrier is selected as the UL carrier for the random access procedure.

* * * * *